United States Patent
Thompson et al.

(10) Patent No.: US 10,138,100 B2
(45) Date of Patent: Nov. 27, 2018

(54) RECHARGING APPARATUS AND METHOD

(71) Applicant: Walmart Apollo, LLC, Bentonville, AR (US)

(72) Inventors: John P. Thompson, Bentonville, AR (US); Michael D. Atchley, Springdale, AR (US); Donald R. High, Noel, MO (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/061,285

(22) Filed: Mar. 4, 2016

(65) Prior Publication Data

US 2016/0257212 A1 Sep. 8, 2016

Related U.S. Application Data

(60) Provisional application No. 62/129,726, filed on Mar. 6, 2015, provisional application No. 62/129,727, filed
(Continued)

(51) Int. Cl.
*H02J 7/00* (2006.01)
*B66F 9/06* (2006.01)
(Continued)

(52) U.S. Cl.
CPC ............ *B66F 9/063* (2013.01); *A47F 3/08* (2013.01); *A47F 10/04* (2013.01); *A47F 13/00* (2013.01);
(Continued)

(58) Field of Classification Search
CPC .. G06Q 10/083; G06Q 10/087; G06Q 30/016; G06Q 30/0281; G06Q 30/0601;
(Continued)

(56) References Cited

U.S. PATENT DOCUMENTS 1,774,653 A 9/1930 Marriott
2,669,345 A 2/1954 Brown
(Continued)

FOREIGN PATENT DOCUMENTS

CA 2524037 5/2006
CA 2625885 4/2007
(Continued)

OTHER PUBLICATIONS

U.S. Appl. No. 15/061,325, filed Mar. 4, 2016, High.
(Continued)

*Primary Examiner* — Vuthe Siek
(74) *Attorney, Agent, or Firm* — Fitch, Even, Tabin & Flannery LLP

(57) ABSTRACT

Methods and apparatuses are provided for use in monitor power levels at a shopping facility, comprising: central control system separate and distinct from a plurality of self-propelled motorized transport units, wherein the central control system comprises: a transceiver configured to wirelessly receive communications from the plurality of motorized transport units; a control circuit coupled with the transceiver; and a memory coupled to the control circuit and storing computer instructions that cause the control circuit to: identify available stored power levels at each of the plurality of motorized transport units; identify an available recharge station, of a plurality of recharge stations distributed throughout the shopping facility, at least relative to a location of the first motorized transport unit intended to be subjected to recharging; and wirelessly communicate one or more instructions to cause the first motorized transport unit to cooperate with an available recharge station.

18 Claims, 8 Drawing Sheets

Related U.S. Application Data on Mar. 6, 2015, provisional application No. 62/138,877, filed on Mar. 26, 2015, provisional application No. 62/138,885, filed on Mar. 26, 2015, provisional application No. 62/152,421, filed on Apr. 24, 2015, provisional application No. 62/152,465, filed on Apr. 24, 2015, provisional application No. 62/152,440, filed on Apr. 24, 2015, provisional application No. 62/152,630, filed on Apr. 24, 2015, provisional application No. 62/152,711, filed on Apr. 24, 2015, provisional application No. 62/152,610, filed on Apr. 24, 2015, provisional application No. 62/152,667, filed on Apr. 24, 2015, provisional application No. 62/157,388, filed on May 5, 2015, provisional application No. 62/165,579, filed on May 22, 2015, provisional application No. 62/165,416, filed on May 22, 2015, provisional application No. 62/165,586, filed on May 22, 2015, provisional application No. 62/171,822, filed on Jun. 5, 2015, provisional application No. 62/175,182, filed on Jun. 12, 2015, provisional application No. 62/182,339, filed on Jun. 19, 2015, provisional application No. 62/185,478, filed on Jun. 26, 2015, provisional application No. 62/194,131, filed on Jul. 17, 2015, provisional application No. 62/194,119, filed on Jul. 17, 2015, provisional application No. 62/194,121, filed on Jul. 17, 2015, provisional application No. 62/194,127, filed on Jul. 17, 2015, provisional application No. 62/202,744, filed on Aug. 7, 2015, provisional application No. 62/202,747, filed on Aug. 7, 2015, provisional application No. 62/205,548, filed on Aug. 14, 2015, provisional application No. 62/205,569, filed on Aug. 14, 2015, provisional application No. 62/205,555, filed on Aug. 14, 2015, provisional application No. 62/205,539, filed on Aug. 14, 2015, provisional application No. 62/207,858, filed on Aug. 20, 2015, provisional application No. 62/214,826, filed on Sep. 4, 2015, provisional application No. 62/214,824, filed on Sep. 4, 2015, provisional application No. 62/292,084, filed on Feb. 5, 2016, provisional application No. 62/302,547, filed on Mar. 2, 2016, provisional application No. 62/302,567, filed on Mar. 2, 2016, provisional application No. 62/302,713, filed on Mar. 2, 2016, provisional application No. 62/303,021, filed on Mar. 3, 2016.

(51) Int. Cl.

| | | |
|---|---|---|
| G01C 21/20 | (2006.01) | |
| G06Q 30/06 | (2012.01) | |
| A47F 10/04 | (2006.01) | |
| H04W 4/80 | (2018.01) | |
| G05D 1/02 | (2006.01) | |
| G06Q 10/02 | (2012.01) | |
| G06Q 50/30 | (2012.01) | |
| G01S 1/02 | (2010.01) | |
| G01S 1/70 | (2006.01) | |
| G01S 1/72 | (2006.01) | |
| G06Q 10/08 | (2012.01) | |
| B62B 5/00 | (2006.01) | |
| G06Q 10/06 | (2012.01) | |
| G06Q 30/02 | (2012.01) | |
| H04W 4/04 | (2009.01) | |
| B60P 3/06 | (2006.01) | |
| G05D 1/00 | (2006.01) | |
| A47F 3/08 | (2006.01) | |
| G06Q 30/00 | (2012.01) | |
| H04N 5/77 | (2006.01) | |
| G06Q 50/28 | (2012.01) | |
| H04N 7/18 | (2006.01) | |
| E01H 5/06 | (2006.01) | |
| E01H 5/12 | (2006.01) | |
| G06Q 10/00 | (2012.01) | |
| G06Q 10/10 | (2012.01) | |
| H04W 4/33 | (2018.01) | |
| G06T 7/73 | (2017.01) | |
| G06T 7/593 | (2017.01) | |
| H04N 13/282 | (2018.01) | |
| A47L 11/40 | (2006.01) | |
| B60L 11/18 | (2006.01) | |
| G05D 1/04 | (2006.01) | |
| G06K 9/00 | (2006.01) | |
| G06K 9/18 | (2006.01) | |
| G06K 9/32 | (2006.01) | |
| G06K 9/62 | (2006.01) | |
| G06K 9/78 | (2006.01) | |
| G08G 1/00 | (2006.01) | |
| G10L 13/04 | (2013.01) | |
| G10L 15/22 | (2006.01) | |
| G10L 17/22 | (2013.01) | |
| H04B 10/116 | (2013.01) | |
| H04L 29/08 | (2006.01) | |
| H04W 4/30 | (2018.01) | |
| A47F 13/00 | (2006.01) | |
| B07C 5/28 | (2006.01) | |
| B07C 5/342 | (2006.01) | |
| B65F 3/00 | (2006.01) | |
| G05B 19/048 | (2006.01) | |
| G06F 3/01 | (2006.01) | |
| H04W 4/02 | (2018.01) | |
| H04W 4/40 | (2018.01) | |
| A47F 10/02 | (2006.01) | |
| H04B 1/38 | (2015.01) | |
| A47F 10/00 | (2006.01) | |
| G05B 19/12 | (2006.01) | |
| G06F 17/30 | (2006.01) | |
| G06K 7/10 | (2006.01) | |
| G06K 7/14 | (2006.01) | |

(52) U.S. Cl.
CPC ............ *A47L 11/4011* (2013.01); *B07C 5/28* (2013.01); *B07C 5/3422* (2013.01); *B60L 11/1833* (2013.01); *B60L 11/1844* (2013.01); *B60P 3/06* (2013.01); *B62B 5/0026* (2013.01); *B62B 5/0069* (2013.01); *B62B 5/0076* (2013.01); *B65F 3/00* (2013.01); *E01H 5/061* (2013.01); *E01H 5/12* (2013.01); *G01C 21/206* (2013.01); *G01S 1/02* (2013.01); *G01S 1/70* (2013.01); *G01S 1/72* (2013.01); *G05B 19/048* (2013.01); *G05D 1/0011* (2013.01); *G05D 1/0016* (2013.01); *G05D 1/0022* (2013.01); *G05D 1/0027* (2013.01); *G05D 1/0061* (2013.01); *G05D 1/0088* (2013.01); *G05D 1/021* (2013.01); *G05D 1/028* (2013.01); *G05D 1/0214* (2013.01); *G05D 1/0219* (2013.01); *G05D 1/0234* (2013.01); *G05D 1/0246* (2013.01); *G05D 1/0255* (2013.01); *G05D 1/0276* (2013.01); *G05D 1/0289* (2013.01); *G05D 1/0291* (2013.01); *G05D 1/0293* (2013.01); *G05D 1/0297* (2013.01); *G05D 1/04* (2013.01); *G06F 3/017* (2013.01); *G06K 9/00208* (2013.01); *G06K 9/00671* (2013.01); *G06K 9/00711* (2013.01);

G06K 9/00771 (2013.01); G06K 9/00791
(2013.01); G06K 9/00805 (2013.01); G06K
9/18 (2013.01); G06K 9/3208 (2013.01);
G06K 9/6256 (2013.01); G06K 9/78
(2013.01); G06Q 10/02 (2013.01); G06Q
10/06311 (2013.01); G06Q 10/083 (2013.01);
G06Q 10/087 (2013.01); G06Q 10/1095
(2013.01); G06Q 10/30 (2013.01); G06Q
30/016 (2013.01); G06Q 30/0281 (2013.01);
G06Q 30/0601 (2013.01); G06Q 30/0605
(2013.01); G06Q 30/0613 (2013.01); G06Q
30/0617 (2013.01); G06Q 30/0619 (2013.01);
G06Q 30/0631 (2013.01); G06Q 30/0633
(2013.01); G06Q 30/0635 (2013.01); G06Q
30/0639 (2013.01); G06Q 30/0641 (2013.01);
G06Q 50/28 (2013.01); G06Q 50/30
(2013.01); G06T 7/593 (2017.01); G06T 7/74
(2017.01); G08G 1/20 (2013.01); G10L
13/043 (2013.01); G10L 15/22 (2013.01);
G10L 17/22 (2013.01); H02J 7/0027
(2013.01); H04B 10/116 (2013.01); H04L
67/12 (2013.01); H04L 67/141 (2013.01);
H04L 67/143 (2013.01); H04N 5/77
(2013.01); H04N 7/18 (2013.01); H04N 7/183
(2013.01); H04N 7/185 (2013.01); H04N
13/282 (2018.05); H04W 4/02 (2013.01);
H04W 4/043 (2013.01); H04W 4/30
(2018.02); H04W 4/33 (2018.02); H04W 4/40
(2018.02); H04W 4/80 (2018.02); A47F
2010/005 (2013.01); A47F 2010/025
(2013.01); A47L 2201/04 (2013.01); B07C
2501/0045 (2013.01); B07C 2501/0054
(2013.01); B07C 2501/0063 (2013.01); B60Y
2410/10 (2013.01); B65F 2210/168 (2013.01);
G05B 19/124 (2013.01); G05B 2219/23363
(2013.01); G05B 2219/39107 (2013.01); G05D
2201/0203 (2013.01); G05D 2201/0216
(2013.01); G06F 17/30979 (2013.01); G06K
7/10297 (2013.01); G06K 7/10821 (2013.01);
G06K 7/1413 (2013.01); G06K 2009/00738
(2013.01); G06Q 10/06315 (2013.01); G06T
2207/10028 (2013.01); G10L 2015/223
(2013.01); H02J 2007/0096 (2013.01); H04B
1/38 (2013.01); Y02W 30/82 (2015.05); Y02W
30/827 (2015.05); Y02W 90/20 (2015.05);
Y10S 901/01 (2013.01)

(58) Field of Classification Search
CPC .......... G06Q 30/0605; G06Q 30/0613; G06Q
30/0619; G06Q 30/0631; G06Q 30/0633;
G06Q 30/0635; G06Q 30/0639; G06Q
30/0641; G06Q 50/02; H04N 5/77; H04N
7/183; H04N 13/0282; H04N 7/18; H04N
7/185; H04W 4/043; Y10S 901/01; A47L
11/4011; B60L 11/1833; B60L 11/1844;
G06K 2009/00738; G06K 9/00208; G06K
9/00671
See application file for complete search history.

(56) References Cited

U.S. PATENT DOCUMENTS

| | | | |
|---|---|---|---|
| 3,765,546 A | 10/1973 | Westerling |
| 4,071,740 A | 1/1978 | Gogulski |
| 4,158,416 A | 6/1979 | Podesta |
| 4,588,349 A | 5/1986 | Reuter |
| 4,672,280 A | 6/1987 | Honjo |
| 4,777,416 A | 10/1988 | George, II |
| 4,791,482 A | 12/1988 | Barry |
| 4,868,544 A | 9/1989 | Havens |
| 4,911,608 A | 3/1990 | Krappitz |
| 5,119,087 A | 6/1992 | Lucas |
| 5,279,672 A | 1/1994 | Betker |
| 5,287,266 A | 2/1994 | Malec |
| 5,295,551 A | 3/1994 | Sukonick |
| 5,363,305 A | 11/1994 | Cox |
| 5,380,138 A | 1/1995 | Kasai |
| 5,384,450 A | 1/1995 | Goetz, Jr. |
| 5,395,206 A | 3/1995 | Cerny, Jr. |
| 5,402,051 A | 3/1995 | Fujiwara |
| 5,548,515 A | 8/1996 | Pilley |
| 5,632,381 A | 5/1997 | Thust |
| 5,652,489 A | 7/1997 | Kawakami |
| 5,671,362 A | 9/1997 | Cowe |
| 5,777,571 A | 7/1998 | Chuang |
| 5,801,340 A | 9/1998 | Peter |
| 5,917,174 A | 6/1999 | Moore |
| 5,920,261 A | 7/1999 | Hughes |
| 5,969,317 A | 10/1999 | Espy |
| 6,018,397 A | 1/2000 | Cloutier |
| 6,199,753 B1 | 3/2001 | Tracy |
| 6,201,203 B1 | 3/2001 | Tilles |
| 6,240,342 B1 | 5/2001 | Fiegert |
| 6,339,735 B1 | 1/2002 | Peless |
| 6,365,857 B1 | 4/2002 | Maehata |
| 6,374,155 B1 | 4/2002 | Wallach |
| 6,394,519 B1 | 5/2002 | Byers |
| 6,431,078 B2 | 8/2002 | Serrano |
| 6,522,952 B1 | 2/2003 | Arai |
| 6,525,509 B1 | 2/2003 | Petersson |
| 6,535,793 B2 | 3/2003 | Allard |
| 6,550,672 B1 | 4/2003 | Tracy |
| 6,571,693 B1 | 6/2003 | Kaldenberg |
| 6,584,375 B2 | 6/2003 | Bancroft |
| 6,584,376 B1 | 6/2003 | VanKommer |
| 6,600,418 B2 | 7/2003 | Francis |
| 6,601,759 B2 | 8/2003 | Fife |
| 6,606,411 B1 | 8/2003 | Loui |
| 6,626,632 B2 | 9/2003 | Guenzi |
| 6,633,800 B1 | 10/2003 | Ward |
| 6,655,897 B1 | 12/2003 | Harwell |
| 6,667,592 B2 | 12/2003 | Jacobs |
| 6,672,601 B1 | 1/2004 | Hofheins |
| 6,678,583 B2 | 1/2004 | Nasr |
| 6,688,435 B1 | 2/2004 | Will |
| 6,728,597 B2 | 4/2004 | Didriksen |
| 6,731,204 B2 | 5/2004 | Lehmann |
| 6,745,186 B1 | 6/2004 | Testa |
| 6,752,582 B2 | 6/2004 | Garcia |
| 6,810,149 B1 | 10/2004 | Squilla |
| 6,816,085 B1 | 11/2004 | Haynes |
| 6,832,884 B2 | 12/2004 | Robinson |
| 6,841,963 B2 | 1/2005 | Song |
| 6,883,201 B2 | 4/2005 | Jones |
| 6,885,736 B2 | 4/2005 | Uppaluru |
| 6,886,101 B2 | 4/2005 | Glazer |
| 6,895,301 B2 | 5/2005 | Mountz |
| 6,910,828 B1 | 6/2005 | Hughes |
| 6,937,989 B2 | 8/2005 | McIntyre |
| 6,954,695 B2 | 10/2005 | Bonilla |
| 6,967,455 B2 | 11/2005 | Nakadai |
| 6,975,997 B1 | 12/2005 | Murakami |
| 7,039,499 B1 | 5/2006 | Nasr |
| 7,066,291 B2 | 6/2006 | Martins |
| 7,101,113 B2 | 9/2006 | Hughes |
| 7,101,139 B1 | 9/2006 | Benedict |
| 7,117,902 B2 | 10/2006 | Osborne |
| 7,145,562 B2 | 12/2006 | Schechter |
| 7,147,154 B2 | 12/2006 | Myers |
| 7,177,820 B2 | 2/2007 | McIntyre |
| 7,184,586 B2 | 2/2007 | Jeon |
| 7,205,016 B2 | 4/2007 | Garwood |
| 7,206,753 B2 | 4/2007 | Bancroft |
| 7,222,363 B2 | 5/2007 | Rice |
| 7,233,241 B2 | 6/2007 | Overhultz |
| 7,234,609 B2 | 6/2007 | DeLazzer |

(56) References Cited

U.S. PATENT DOCUMENTS

| | | |
|---|---|---|
| 7,261,511 B2 | 8/2007 | Felder |
| 7,367,245 B2 | 5/2008 | Okazaki |
| 7,381,022 B1 | 6/2008 | King |
| 7,402,018 B2 | 7/2008 | Mountz |
| 7,431,208 B2 | 10/2008 | Feldman |
| 7,447,564 B2 | 11/2008 | Yasukawa |
| 7,463,147 B1 | 12/2008 | Laffoon |
| 7,474,945 B2 | 1/2009 | Matsunaga |
| 7,487,913 B2 | 2/2009 | Adema |
| 7,533,029 B2 | 5/2009 | Mallett |
| 7,554,282 B2 | 6/2009 | Nakamoto |
| 7,556,108 B2 | 7/2009 | Won |
| 7,556,219 B2 | 7/2009 | Page |
| 7,587,756 B2 | 9/2009 | Peart |
| 7,613,544 B2 | 11/2009 | Park |
| 7,627,515 B2 | 12/2009 | Borgs |
| 7,636,045 B2 | 12/2009 | Sugiyama |
| 7,648,068 B2 | 1/2010 | Silverbrook |
| 7,653,603 B1 | 1/2010 | Holtkamp, Jr. |
| 7,658,327 B2 | 2/2010 | Tuchman |
| 7,689,322 B2 | 3/2010 | Tanaka |
| 7,693,605 B2 | 4/2010 | Park |
| 7,693,745 B1 | 4/2010 | Pomerantz |
| 7,693,757 B2 | 4/2010 | Zimmerman |
| 7,706,917 B1 | 4/2010 | Chiappetta |
| 7,716,064 B2 | 5/2010 | McIntyre |
| 7,726,563 B2 | 6/2010 | Scott |
| 7,762,458 B2 | 7/2010 | Stawar |
| 7,783,527 B2 | 8/2010 | Bonner |
| 7,787,985 B2 | 8/2010 | Tsujimoto |
| 7,817,394 B2 | 10/2010 | Mukherjee |
| 7,826,919 B2 | 11/2010 | DAndrea |
| 7,835,281 B2 | 11/2010 | Lee |
| 7,894,932 B2 | 2/2011 | Mountz |
| 7,894,939 B2 | 2/2011 | Zini |
| 7,969,297 B2 | 6/2011 | Haartsen |
| 7,996,109 B2 | 8/2011 | Zini |
| 8,010,230 B2 | 8/2011 | Zini |
| 8,032,249 B1 | 10/2011 | Shakes |
| 8,041,455 B2 | 10/2011 | Thorne |
| 8,050,976 B2 | 11/2011 | Staib |
| 8,065,032 B2 | 11/2011 | Stifter |
| 8,065,353 B2 | 11/2011 | Eckhoff-Hornback |
| 8,069,092 B2 | 11/2011 | Bryant |
| 8,083,013 B2 | 12/2011 | Bewley |
| 8,099,191 B2 | 1/2012 | Blanc |
| 8,103,398 B2 | 1/2012 | Duggan |
| 8,195,333 B2 | 6/2012 | Ziegler |
| 8,239,276 B2 | 8/2012 | Lin |
| 8,244,041 B1 | 8/2012 | Silver |
| 8,248,467 B1 | 8/2012 | Ganick |
| 8,260,456 B2 | 9/2012 | Siegel |
| 8,284,240 B2 | 10/2012 | Saint-Pierre |
| 8,295,542 B2 | 10/2012 | Albertson |
| 8,321,303 B1 | 11/2012 | Krishnamurthy |
| 8,325,036 B1 | 12/2012 | Fuhr |
| 8,342,467 B2 | 1/2013 | Stachowski |
| 8,352,110 B1 | 1/2013 | Szybalski |
| 8,359,122 B2 | 1/2013 | Koselka |
| 8,380,349 B1 | 2/2013 | Hickman |
| 8,393,846 B1 | 3/2013 | Coots |
| 8,412,400 B2 | 4/2013 | DAndrea |
| 8,423,280 B2 | 4/2013 | Edwards |
| 8,425,173 B2 | 4/2013 | Lert |
| 8,429,004 B2 | 4/2013 | Hamilton |
| 8,430,192 B2 | 4/2013 | Gillett |
| 8,433,470 B1 | 4/2013 | Szybalski |
| 8,433,507 B2 | 4/2013 | Hannah |
| 8,437,875 B2 | 5/2013 | Hernandez |
| 8,444,369 B2 | 5/2013 | Watt |
| 8,447,863 B1 | 5/2013 | Francis, Jr. |
| 8,452,450 B2 | 5/2013 | Dooley |
| 8,474,090 B2 | 7/2013 | Jones |
| 8,494,908 B2 | 7/2013 | Herwig |
| 8,504,202 B2 | 8/2013 | Ichinose |
| 8,508,590 B2 | 8/2013 | Laws |
| 8,510,033 B2 | 8/2013 | Park |
| 8,511,606 B1 | 8/2013 | Lutke |
| 8,515,580 B2 | 8/2013 | Taylor |
| 8,516,651 B2 | 8/2013 | Jones |
| 8,538,577 B2 | 9/2013 | Bell |
| 8,544,858 B2 | 10/2013 | Eberlein |
| 8,571,700 B2 | 10/2013 | Keller |
| 8,572,712 B2 | 10/2013 | Rice |
| 8,577,538 B2 | 11/2013 | Lenser |
| 8,587,662 B1 | 11/2013 | Moll |
| 8,588,969 B2 | 11/2013 | Frazier |
| 8,594,834 B1 | 11/2013 | Clark |
| 8,606,314 B2 | 12/2013 | Barnes, Jr. |
| 8,606,392 B2 | 12/2013 | Wurman |
| 8,639,382 B1 | 1/2014 | Clark |
| 8,645,223 B2 | 2/2014 | Ouimet |
| 8,649,557 B2 | 2/2014 | Hyung |
| 8,656,550 B2 | 2/2014 | Jones |
| 8,670,866 B2 | 3/2014 | Ziegler |
| 8,671,507 B2 | 3/2014 | Jones |
| 8,676,377 B2 | 3/2014 | Siegel |
| 8,676,420 B2 | 3/2014 | Kume |
| 8,676,480 B2 | 3/2014 | Lynch |
| 8,700,230 B1 | 4/2014 | Hannah |
| 8,708,285 B1 | 4/2014 | Carreiro |
| 8,718,814 B1 | 5/2014 | Clark |
| 8,724,282 B2 | 5/2014 | Hiremath |
| 8,732,039 B1 | 5/2014 | Chen |
| 8,744,626 B2 | 6/2014 | Johnson |
| 8,751,042 B2 | 6/2014 | Lee |
| 8,763,199 B2 | 7/2014 | Jones |
| 8,770,976 B2 | 7/2014 | Moser |
| 8,775,064 B2 | 7/2014 | Zeng |
| 8,798,786 B2 | 8/2014 | Wurman |
| 8,798,840 B2 | 8/2014 | Fong |
| 8,814,039 B2 | 8/2014 | Bishop |
| 8,818,556 B2 | 8/2014 | Sanchez |
| 8,820,633 B2 | 9/2014 | Bishop |
| 8,825,226 B1 | 9/2014 | Worley, III |
| 8,831,984 B2 | 9/2014 | Hoffman |
| 8,838,268 B2 | 9/2014 | Friedman |
| 8,843,244 B2 | 9/2014 | Phillips |
| 8,851,369 B2 | 10/2014 | Bishop |
| 8,882,432 B2 | 11/2014 | Bastian, II |
| 8,886,390 B2 | 11/2014 | Wolfe |
| 8,892,240 B1 | 11/2014 | Vliet |
| 8,892,241 B2 | 11/2014 | Weiss |
| 8,899,903 B1 | 12/2014 | Saad |
| 8,918,202 B2 | 12/2014 | Kawano |
| 8,918,230 B2 | 12/2014 | Chen |
| 8,930,044 B1 | 1/2015 | Peeters |
| 8,965,561 B2 | 2/2015 | Jacobus |
| 8,972,045 B1 | 3/2015 | Mountz |
| 8,972,061 B2 | 3/2015 | Rosenstein |
| 8,983,647 B1 | 3/2015 | Dwarakanath |
| 8,989,053 B1 | 3/2015 | Skaaksrud |
| 9,002,506 B1 | 4/2015 | Agarwal |
| 9,008,827 B1 | 4/2015 | Dwarakanath |
| 9,008,829 B2 | 4/2015 | Worsley |
| 9,014,848 B2 | 4/2015 | Farlow |
| 9,075,136 B1 | 7/2015 | Joao |
| 9,129,277 B2 | 9/2015 | MacIntosh |
| 9,170,117 B1 | 10/2015 | Abuelsaad |
| 9,173,816 B2 | 11/2015 | Reinhardt |
| 9,190,304 B2 | 11/2015 | MacKnight |
| 1,506,144 A1 | 3/2016 | High |
| 9,278,839 B2 | 3/2016 | Gilbride |
| 9,305,280 B1 | 4/2016 | Berg |
| 9,329,597 B2 | 5/2016 | Stoschek |
| 1,527,500 A1 | 9/2016 | High |
| 1,527,501 A1 | 9/2016 | High |
| 1,527,504 A1 | 9/2016 | High |
| 1,528,295 A1 | 9/2016 | High |
| 1,528,892 A1 | 10/2016 | High |
| 9,495,703 B1 | 11/2016 | Kaye |
| 9,534,906 B2 | 1/2017 | High |
| 9,550,577 B1 | 1/2017 | Beckman |
| 1,542,381 A1 | 2/2017 | High |

(56) References Cited

U.S. PATENT DOCUMENTS

| | | |
|---|---|---|
| 9,573,684 B2 | 2/2017 | Kimchi |
| 9,578,282 B1 | 2/2017 | Sills |
| 1,544,691 A1 | 3/2017 | High |
| 1,544,717 A1 | 3/2017 | High |
| 1,544,720 A1 | 3/2017 | High |
| 1,547,127 A1 | 3/2017 | High |
| 9,607,285 B1 | 3/2017 | Wellman |
| 9,623,923 B2 | 4/2017 | Riedel |
| 9,649,766 B2 | 5/2017 | Stubbs |
| 9,656,805 B1 | 5/2017 | Evans |
| 9,658,622 B2 | 5/2017 | Walton |
| 9,663,292 B1 | 5/2017 | Brazeau |
| 9,663,293 B2 | 5/2017 | Wurman |
| 9,663,295 B1 | 5/2017 | Wurman |
| 9,663,296 B1 | 5/2017 | Dingle |
| 1,569,222 A1 | 8/2017 | High |
| 9,747,480 B2 | 8/2017 | McAllister |
| 9,757,002 B2 | 9/2017 | Thompson |
| 9,801,517 B2 | 10/2017 | High |
| 9,827,678 B1 | 11/2017 | Gilbertson |
| 1,583,670 A1 | 12/2017 | High |
| 9,875,502 B2 | 1/2018 | Kay |
| 9,875,503 B2 | 1/2018 | High |
| 1,589,225 A1 | 2/2018 | High |
| 1,589,415 A1 | 2/2018 | High |
| 9,896,315 B2 | 3/2018 | High |
| 9,908,760 B2 | 3/2018 | High |
| 9,994,434 B2 | 6/2018 | High |
| 2001/0042024 A1 | 11/2001 | Rogers |
| 2002/0060542 A1 | 5/2002 | Song |
| 2002/0095342 A1 | 7/2002 | Feldman |
| 2002/0154974 A1 | 10/2002 | Fukuda |
| 2002/0156551 A1 | 10/2002 | Tackett |
| 2002/0165638 A1 | 11/2002 | Bancroft |
| 2002/0165643 A1 | 11/2002 | Bancroft |
| 2002/0165790 A1 | 11/2002 | Bancroft |
| 2002/0174021 A1 | 11/2002 | Chu |
| 2003/0028284 A1 | 2/2003 | Chirnomas |
| 2003/0152679 A1 | 8/2003 | Garwood |
| 2003/0170357 A1 | 9/2003 | Garwood |
| 2003/0185948 A1 | 10/2003 | Garwood |
| 2003/0222798 A1 | 12/2003 | Floros |
| 2004/0068348 A1 | 4/2004 | Jager |
| 2004/0081729 A1 | 4/2004 | Garwood |
| 2004/0093650 A1 | 5/2004 | Martins |
| 2004/0098167 A1 | 5/2004 | Yi |
| 2004/0117063 A1 | 6/2004 | Sabe |
| 2004/0146602 A1 | 7/2004 | Garwood |
| 2004/0216339 A1 | 11/2004 | Garberg |
| 2004/0217166 A1 | 11/2004 | Myers |
| 2004/0221790 A1 | 11/2004 | Sinclair |
| 2004/0225613 A1 | 11/2004 | Narayanaswami |
| 2004/0249497 A1 | 12/2004 | Saigh |
| 2005/0008463 A1 | 1/2005 | Stehr |
| 2005/0047895 A1 | 3/2005 | Lert |
| 2005/0072651 A1 | 4/2005 | Wieth |
| 2005/0080520 A1 | 4/2005 | Kline |
| 2005/0104547 A1 | 5/2005 | Wang |
| 2005/0149414 A1 | 7/2005 | Schrodt |
| 2005/0177446 A1 | 8/2005 | Hoblit |
| 2005/0216126 A1 | 9/2005 | Koselka |
| 2005/0222712 A1 | 10/2005 | Orita |
| 2005/0230472 A1 | 10/2005 | Chang |
| 2005/0238465 A1 | 10/2005 | Razumov |
| 2006/0107067 A1 | 5/2006 | Safal |
| 2006/0147087 A1 | 7/2006 | Goncalves |
| 2006/0163350 A1 | 7/2006 | Melton |
| 2006/0178777 A1 | 8/2006 | Park |
| 2006/0206235 A1 | 9/2006 | Shakes |
| 2006/0220809 A1 | 10/2006 | Stigall |
| 2006/0221072 A1 | 10/2006 | Se |
| 2006/0231301 A1 | 10/2006 | Rose |
| 2006/0235570 A1 | 10/2006 | Jung |
| 2006/0241827 A1 | 10/2006 | Fukuchi |
| 2006/0244588 A1 | 11/2006 | Hannah |
| 2006/0279421 A1 | 12/2006 | French |
| 2006/0293810 A1 | 12/2006 | Nakamoto |
| 2007/0005179 A1 | 1/2007 | Mccrackin |
| 2007/0017855 A1 | 1/2007 | Pippin |
| 2007/0045018 A1 | 3/2007 | Carter |
| 2007/0061210 A1 | 3/2007 | Chen |
| 2007/0085682 A1 | 4/2007 | Murofushi |
| 2007/0125727 A1 | 6/2007 | Winkler |
| 2007/0150368 A1 | 6/2007 | Arora |
| 2007/0152057 A1 | 7/2007 | Cato |
| 2007/0222679 A1 | 9/2007 | Morris |
| 2007/0269299 A1 | 11/2007 | Ross |
| 2007/0284442 A1 | 12/2007 | Herskovitz |
| 2007/0288123 A1 | 12/2007 | D Andrea |
| 2007/0293978 A1 | 12/2007 | Wurman |
| 2008/0011836 A1 | 1/2008 | Adema |
| 2008/0031491 A1 | 2/2008 | Ma |
| 2008/0041644 A1 | 2/2008 | Tudek |
| 2008/0042836 A1 | 2/2008 | Christopher |
| 2008/0075566 A1 | 3/2008 | Benedict |
| 2008/0075568 A1 | 3/2008 | Benedict |
| 2008/0075569 A1 | 3/2008 | Benedict |
| 2008/0077511 A1 | 3/2008 | Zimmerman |
| 2008/0105445 A1 | 5/2008 | Dayton |
| 2008/0131255 A1 | 6/2008 | Hessler |
| 2008/0140253 A1 | 6/2008 | Brown |
| 2008/0154720 A1 | 6/2008 | Gounares |
| 2008/0201227 A1 | 8/2008 | Bakewell |
| 2008/0226129 A1 | 9/2008 | Kundu |
| 2008/0267759 A1 | 10/2008 | Morency |
| 2008/0281515 A1 | 11/2008 | Ann |
| 2008/0281664 A1 | 11/2008 | Campbell |
| 2008/0294288 A1 | 11/2008 | Yamauchi |
| 2008/0306787 A1 | 12/2008 | Hamilton |
| 2008/0308630 A1 | 12/2008 | Bhogal |
| 2008/0314667 A1 | 12/2008 | Hannah |
| 2009/0074545 A1 | 3/2009 | Lert |
| 2009/0132250 A1 | 5/2009 | Chiang |
| 2009/0134572 A1 | 5/2009 | Obuchi |
| 2009/0138375 A1 | 5/2009 | Schwartz |
| 2009/0154708 A1 | 6/2009 | Kolar Sunder |
| 2009/0155033 A1 | 6/2009 | Olsen |
| 2009/0164902 A1 | 6/2009 | Cohen |
| 2009/0210536 A1 | 8/2009 | Allen |
| 2009/0240571 A1 | 9/2009 | Bonner |
| 2009/0259571 A1 | 10/2009 | Ebling |
| 2009/0265193 A1 | 10/2009 | Collins |
| 2009/0269173 A1 | 10/2009 | De Leo |
| 2009/0299822 A1 | 12/2009 | Harari |
| 2009/0319399 A1 | 12/2009 | Resta |
| 2010/0025964 A1 | 2/2010 | Fisk |
| 2010/0030417 A1 | 2/2010 | Fang |
| 2010/0076959 A1 | 3/2010 | Ramani |
| 2010/0138281 A1 | 6/2010 | Zhang |
| 2010/0143089 A1 | 6/2010 | Hvass |
| 2010/0171826 A1 | 7/2010 | Hamilton |
| 2010/0176922 A1 | 7/2010 | Schwab |
| 2010/0211441 A1 | 8/2010 | Sprigg |
| 2010/0222925 A1 | 9/2010 | Anezaki |
| 2010/0268697 A1 | 10/2010 | Karlsson |
| 2010/0295847 A1 | 11/2010 | Titus |
| 2010/0299065 A1 | 11/2010 | Mays |
| 2010/0302102 A1 | 12/2010 | Desai |
| 2010/0324773 A1 | 12/2010 | Choi |
| 2011/0010023 A1 | 1/2011 | Kunzig |
| 2011/0022201 A1 | 1/2011 | Reumerman |
| 2011/0098920 A1 | 4/2011 | Chuang |
| 2011/0153081 A1 | 6/2011 | Romanov |
| 2011/0163160 A1 | 7/2011 | Zini |
| 2011/0176803 A1 | 7/2011 | Song |
| 2011/0225071 A1 | 9/2011 | Sano |
| 2011/0240777 A1 | 10/2011 | Johns |
| 2011/0258060 A1 | 10/2011 | Sweeney |
| 2011/0260865 A1 | 10/2011 | Bergman |
| 2011/0279252 A1 | 11/2011 | Carter |
| 2011/0288684 A1 | 11/2011 | Farlow |
| 2011/0288763 A1 | 11/2011 | Hui |
| 2011/0295424 A1 | 12/2011 | Johnson |
| 2011/0301757 A1 | 12/2011 | Jones |

(56) References Cited

U.S. PATENT DOCUMENTS

| | | |
|---|---|---|
| 2011/0320034 A1 | 12/2011 | Dearlove |
| 2011/0320322 A1 | 12/2011 | Roslak |
| 2012/0000024 A1 | 1/2012 | Layton |
| 2012/0029697 A1 | 2/2012 | Ota |
| 2012/0035823 A1 | 2/2012 | Carter |
| 2012/0046998 A1 | 2/2012 | Staib |
| 2012/0059743 A1 | 3/2012 | Rao |
| 2012/0072303 A1 | 3/2012 | Brown |
| 2012/0134771 A1 | 5/2012 | Larson |
| 2012/0143726 A1 | 6/2012 | Chirnomas |
| 2012/0192260 A1 | 7/2012 | Kontsevich |
| 2012/0226556 A1 | 9/2012 | Itagaki |
| 2012/0239224 A1 | 9/2012 | McCabe |
| 2012/0255810 A1 | 10/2012 | Yang |
| 2012/0259732 A1 | 10/2012 | Sasankan |
| 2012/0272500 A1 | 11/2012 | Reuteler |
| 2012/0294698 A1 | 11/2012 | Villamar |
| 2012/0303263 A1 | 11/2012 | Alam |
| 2012/0303479 A1 | 11/2012 | Derks |
| 2012/0330458 A1 | 12/2012 | Weiss |
| 2013/0016011 A1 | 1/2013 | Harriman |
| 2013/0026224 A1 | 1/2013 | Ganick |
| 2013/0051667 A1 | 2/2013 | Deng |
| 2013/0054052 A1 | 2/2013 | Waltz |
| 2013/0054280 A1 | 2/2013 | Moshfeghi |
| 2013/0060461 A1 | 3/2013 | Wong |
| 2013/0073405 A1 | 3/2013 | Ariyibi |
| 2013/0096735 A1 | 4/2013 | Byford |
| 2013/0103539 A1 | 4/2013 | Abraham |
| 2013/0105036 A1 | 5/2013 | Smith |
| 2013/0110671 A1 | 5/2013 | Gray |
| 2013/0141555 A1 | 6/2013 | Ganick |
| 2013/0145572 A1 | 6/2013 | Schregardus |
| 2013/0151335 A1 | 6/2013 | Avadhanam |
| 2013/0155058 A1 | 6/2013 | Golparvar-Fard |
| 2013/0174371 A1 | 7/2013 | Jones |
| 2013/0181370 A1 | 7/2013 | Rafie |
| 2013/0211953 A1 | 8/2013 | Abraham |
| 2013/0218453 A1 | 8/2013 | Geelen |
| 2013/0235206 A1 | 9/2013 | Smith |
| 2013/0238130 A1 | 9/2013 | Dorschel |
| 2013/0276004 A1 | 10/2013 | Boncyk |
| 2013/0300729 A1 | 11/2013 | Grimaud |
| 2013/0302132 A1 | 11/2013 | DAndrea |
| 2013/0309637 A1 | 11/2013 | Minvielle |
| 2013/0317642 A1 | 11/2013 | Asaria |
| 2013/0333961 A1 | 12/2013 | ODonnell |
| 2013/0338825 A1 | 12/2013 | Cantor |
| 2014/0006229 A1 | 1/2014 | Birch |
| 2014/0014470 A1 | 1/2014 | Razumov |
| 2014/0032034 A1 | 1/2014 | Raptopoulos |
| 2014/0032379 A1 | 1/2014 | Schuetz |
| 2014/0037404 A1 | 2/2014 | Hancock |
| 2014/0046512 A1 | 2/2014 | Villamar |
| 2014/0058556 A1 | 2/2014 | Kawano |
| 2014/0067564 A1 | 3/2014 | Yuan |
| 2014/0081445 A1 | 3/2014 | Villamar |
| 2014/0091013 A1 | 4/2014 | Streufert |
| 2014/0100715 A1 | 4/2014 | Mountz |
| 2014/0100768 A1 | 4/2014 | Kessens |
| 2014/0100769 A1 | 4/2014 | Wurman |
| 2014/0100998 A1 | 4/2014 | Mountz |
| 2014/0100999 A1 | 4/2014 | Mountz |
| 2014/0101690 A1 | 4/2014 | Boncyk |
| 2014/0108087 A1 | 4/2014 | Fukui |
| 2014/0124004 A1 | 5/2014 | Rosenstein |
| 2014/0129054 A1* | 5/2014 | Huntzicker ............. G06F 17/00 701/2 |
| 2014/0133943 A1 | 5/2014 | Razumov |
| 2014/0135984 A1 | 5/2014 | Hirata |
| 2014/0143039 A1 | 5/2014 | Branton |
| 2014/0149958 A1 | 5/2014 | Samadi |
| 2014/0152507 A1 | 6/2014 | McAllister |
| 2014/0156450 A1 | 6/2014 | Ruckart |
| 2014/0156461 A1 | 6/2014 | Lerner |
| 2014/0157156 A1 | 6/2014 | Kawamoto |
| 2014/0164123 A1 | 6/2014 | Wissner-Gross |
| 2014/0172197 A1 | 6/2014 | Ganz |
| 2014/0172727 A1 | 6/2014 | Abhyanker |
| 2014/0177907 A1 | 6/2014 | Argue |
| 2014/0177924 A1 | 6/2014 | Argue |
| 2014/0180478 A1 | 6/2014 | Letsky |
| 2014/0180528 A1 | 6/2014 | Argue |
| 2014/0180865 A1 | 6/2014 | Argue |
| 2014/0180914 A1 | 6/2014 | Abhyanker |
| 2014/0201041 A1 | 7/2014 | Meyer |
| 2014/0207614 A1 | 7/2014 | Ramaswamy |
| 2014/0209514 A1 | 7/2014 | Gitschel |
| 2014/0211988 A1 | 7/2014 | Fan |
| 2014/0214205 A1 | 7/2014 | Kwon |
| 2014/0217242 A1 | 8/2014 | Muren |
| 2014/0228999 A1 | 8/2014 | D'Andrea |
| 2014/0229320 A1 | 8/2014 | Mohammed |
| 2014/0244026 A1 | 8/2014 | Neiser |
| 2014/0244207 A1 | 8/2014 | Hicks |
| 2014/0246257 A1 | 9/2014 | Jacobsen |
| 2014/0247116 A1 | 9/2014 | Davidson |
| 2014/0250613 A1 | 9/2014 | Jones |
| 2014/0254896 A1 | 9/2014 | Zhou |
| 2014/0257928 A1 | 9/2014 | Chen |
| 2014/0266616 A1 | 9/2014 | Jones |
| 2014/0274309 A1 | 9/2014 | Nguyen |
| 2014/0277693 A1 | 9/2014 | Naylor |
| 2014/0277742 A1 | 9/2014 | Wells |
| 2014/0277841 A1 | 9/2014 | Klicpera |
| 2014/0285134 A1* | 9/2014 | Kim ....................... H02J 7/025 320/103 |
| 2014/0289009 A1 | 9/2014 | Campbell |
| 2014/0297090 A1 | 10/2014 | Ichinose |
| 2014/0304107 A1 | 10/2014 | McAllister |
| 2014/0306654 A1* | 10/2014 | Partovi ................... H02J 7/025 320/108 |
| 2014/0309809 A1 | 10/2014 | Dixon |
| 2014/0330456 A1 | 11/2014 | LopezMorales |
| 2014/0330677 A1 | 11/2014 | Boncyk |
| 2014/0344118 A1 | 11/2014 | Parpia |
| 2014/0350725 A1 | 11/2014 | LaFary |
| 2014/0350851 A1 | 11/2014 | Carter |
| 2014/0350855 A1 | 11/2014 | Vishnuvajhala |
| 2014/0361077 A1 | 12/2014 | Davidson |
| 2014/0369558 A1 | 12/2014 | Holz |
| 2014/0371912 A1 | 12/2014 | Passot |
| 2014/0379588 A1 | 12/2014 | Gates |
| 2015/0029339 A1 | 1/2015 | Kobres |
| 2015/0032252 A1 | 1/2015 | Galluzzo |
| 2015/0045992 A1 | 2/2015 | Ashby |
| 2015/0046299 A1 | 2/2015 | Yan |
| 2015/0066283 A1 | 3/2015 | Wurman |
| 2015/0073589 A1 | 3/2015 | Khodl |
| 2015/0098775 A1 | 4/2015 | Razumov |
| 2015/0100439 A1 | 4/2015 | Lu |
| 2015/0100461 A1 | 4/2015 | Baryakar |
| 2015/0112826 A1 | 4/2015 | Crutchfield |
| 2015/0120094 A1 | 4/2015 | Kimchi |
| 2015/0123973 A1 | 5/2015 | Larsen |
| 2015/0142249 A1 | 5/2015 | Ooga |
| 2015/0203140 A1 | 7/2015 | Holtan |
| 2015/0205298 A1 | 7/2015 | Stoschek |
| 2015/0205300 A1 | 7/2015 | Caver |
| 2015/0217449 A1 | 8/2015 | Meier |
| 2015/0217790 A1 | 8/2015 | Golden |
| 2015/0221854 A1 | 8/2015 | Melz |
| 2015/0229906 A1 | 8/2015 | Inacio De Matos |
| 2015/0231873 A1 | 8/2015 | Okamoto |
| 2015/0277440 A1 | 10/2015 | Kimchi |
| 2015/0278889 A1 | 10/2015 | Qian |
| 2015/0325128 A1 | 11/2015 | Lord |
| 2015/0336668 A1 | 11/2015 | Pasko |
| 2015/0360865 A1 | 12/2015 | Massey |
| 2016/0016731 A1 | 1/2016 | Razumov |
| 2016/0023675 A1 | 1/2016 | Hannah |
| 2016/0052139 A1 | 2/2016 | Hyde |
| 2016/0101794 A1 | 4/2016 | Fowler |
| 2016/0101936 A1 | 4/2016 | Chamberlin |

(56) References Cited

U.S. PATENT DOCUMENTS

| | | | |
|---|---|---|---|
| 2016/0110701 A1 | 4/2016 | Herring |
| 2016/0114488 A1 | 4/2016 | Mascorro Medina |
| 2016/0167557 A1 | 6/2016 | Mecklinger |
| 2016/0167577 A1 | 6/2016 | Simmons |
| 2016/0176638 A1 | 6/2016 | Toebes |
| 2016/0196755 A1 | 7/2016 | Navot |
| 2016/0207193 A1 | 7/2016 | Wise |
| 2016/0210602 A1 | 7/2016 | Siddique |
| 2016/0236867 A1 | 8/2016 | Brazeau |
| 2016/0255969 A1 | 9/2016 | High |
| 2016/0257240 A1 | 9/2016 | High |
| 2016/0257401 A1 | 9/2016 | Buchmueller |
| 2016/0258762 A1 | 9/2016 | Taylor |
| 2016/0258763 A1 | 9/2016 | High |
| 2016/0259028 A1 | 9/2016 | High |
| 2016/0259329 A1 | 9/2016 | High |
| 2016/0259331 A1 | 9/2016 | Thompson |
| 2016/0259339 A1 | 9/2016 | High |
| 2016/0259340 A1 | 9/2016 | Kay |
| 2016/0259341 A1 | 9/2016 | High |
| 2016/0259342 A1 | 9/2016 | High |
| 2016/0259343 A1 | 9/2016 | High |
| 2016/0259344 A1 | 9/2016 | High |
| 2016/0259345 A1 | 9/2016 | McHale |
| 2016/0259346 A1 | 9/2016 | High |
| 2016/0260049 A1 | 9/2016 | High |
| 2016/0260054 A1 | 9/2016 | High |
| 2016/0260055 A1 | 9/2016 | High |
| 2016/0260142 A1 | 9/2016 | Winkle |
| 2016/0260145 A1 | 9/2016 | High |
| 2016/0260148 A1 | 9/2016 | High |
| 2016/0260158 A1 | 9/2016 | High |
| 2016/0260159 A1 | 9/2016 | Atchley |
| 2016/0260161 A1 | 9/2016 | Atchley |
| 2016/0261698 A1 | 9/2016 | Thompson |
| 2016/0274586 A1 | 9/2016 | Stubbs |
| 2016/0288601 A1 | 10/2016 | Gehrke |
| 2016/0300291 A1 | 10/2016 | Carmeli |
| 2016/0301698 A1 | 10/2016 | Katara |
| 2016/0325932 A1 | 11/2016 | Hognaland |
| 2016/0349754 A1 | 12/2016 | Mohr |
| 2016/0355337 A1 | 12/2016 | Lert |
| 2016/0364785 A1 | 12/2016 | Wankhede |
| 2016/0364786 A1 | 12/2016 | Wankhede |
| 2017/0009417 A1 | 1/2017 | High |
| 2017/0010608 A1 | 1/2017 | High |
| 2017/0010609 A1 | 1/2017 | High |
| 2017/0010610 A1 | 1/2017 | Atchley |
| 2017/0020354 A1 | 1/2017 | High |
| 2017/0024806 A1 | 1/2017 | High |
| 2017/0080846 A1 | 3/2017 | Lord |
| 2017/0107055 A1 | 4/2017 | Magens |
| 2017/0110017 A1 | 4/2017 | Kimchi |
| 2017/0120443 A1 | 5/2017 | Kang |
| 2017/0129602 A1 | 5/2017 | Alduaiji |
| 2017/0137235 A1 | 5/2017 | Thompson |
| 2017/0148075 A1 | 5/2017 | High |
| 2017/0158430 A1 | 6/2017 | Raizer |
| 2017/0166399 A1 | 6/2017 | Stubbs |
| 2017/0176986 A1 | 6/2017 | High |
| 2017/0178066 A1 | 6/2017 | High |
| 2017/0178082 A1 | 6/2017 | High |
| 2017/0183159 A1 | 6/2017 | Weiss |
| 2017/0283171 A1 | 10/2017 | High |
| 2017/0355081 A1 | 12/2017 | Fisher |
| 2018/0020896 A1 | 1/2018 | High |
| 2018/0068357 A1 | 3/2018 | High |
| 2018/0099846 A1 | 4/2018 | High |

FOREIGN PATENT DOCUMENTS

| | | |
|---|---|---|
| CN | 100999277 | 7/2007 |
| CN | 102079433 | 6/2011 |
| CN | 202847767 | 4/2013 |
| CN | 103136923 | 5/2013 |
| CN | 103213115 | 7/2013 |
| CN | 203166399 | 8/2013 |
| CN | 203191819 | 9/2013 |
| CN | 203401274 | 1/2014 |
| CN | 203402565 | 1/2014 |
| CN | 103625808 | 3/2014 |
| CN | 203468521 | 3/2014 |
| CN | 103696393 | 4/2014 |
| CN | 103723403 | 4/2014 |
| CN | 203512491 | 4/2014 |
| CN | 103770117 | 5/2014 |
| CN | 203782622 | 8/2014 |
| CN | 104102188 | 10/2014 |
| CN | 104102219 | 10/2014 |
| CN | 102393739 | 12/2014 |
| CN | 204054062 | 12/2014 |
| CN | 204309852 | 12/2014 |
| CN | 204331404 | 5/2015 |
| CN | 105460051 | 4/2016 |
| DE | 102013013438 | 2/2015 |
| EP | 861415 | 5/1997 |
| EP | 1136052 | 9/2001 |
| EP | 0887491 | 4/2004 |
| EP | 1439039 | 7/2004 |
| EP | 1447726 | 8/2004 |
| EP | 2148169 | 1/2010 |
| EP | 2106886 | 3/2011 |
| EP | 2309487 | 4/2011 |
| EP | 2050544 | 8/2011 |
| EP | 2498158 | 9/2012 |
| EP | 2571660 | 3/2013 |
| EP | 2590041 | 5/2013 |
| EP | 2608163 | 6/2013 |
| EP | 2662831 | 11/2013 |
| EP | 2730377 | 5/2014 |
| EP | 2886020 | 6/2015 |
| FR | 2710330 | 3/1995 |
| GB | 1382806 | 2/1971 |
| GB | 2530626 | 3/2016 |
| GB | 2542472 | 3/2017 |
| GB | 2542905 | 5/2017 |
| JP | 62247458 | 10/1987 |
| JP | H10129996 | 5/1998 |
| JP | 2003288396 | 10/2003 |
| JP | 2005350222 | 12/2005 |
| JP | 2009284944 | 12/2009 |
| JP | 2010105644 | 5/2010 |
| JP | 2010231470 | 10/2010 |
| KR | 20120100505 A | 9/2012 |
| WO | 8503277 A | 8/1985 |
| WO | 9603305 | 7/1995 |
| WO | 1997018523 | 5/1997 |
| WO | 9855903 | 12/1998 |
| WO | 2000061438 | 10/2000 |
| WO | 0132366 | 5/2001 |
| WO | 2004092858 | 10/2004 |
| WO | 2005102875 | 11/2005 |
| WO | 2006056614 | 6/2006 |
| WO | 2006120636 | 11/2006 |
| WO | 2006137072 | 12/2006 |
| WO | 2007007354 | 1/2007 |
| WO | 2007047514 | 4/2007 |
| WO | 2007149196 | 12/2007 |
| WO | 2008118906 | 10/2008 |
| WO | 2008144638 | 11/2008 |
| WO | 2008151345 | 12/2008 |
| WO | 2009022859 | 2/2009 |
| WO | 2009027835 | 3/2009 |
| WO | 2009103008 | 8/2009 |
| WO | 2011063527 | 6/2011 |
| WO | 2012075196 | 6/2012 |
| WO | 2013138193 | 9/2013 |
| WO | 2013138333 | 9/2013 |
| WO | 2013176762 | 11/2013 |
| WO | 2014022366 | 2/2014 |
| WO | 2014022496 | 2/2014 |
| WO | 2014045225 | 3/2014 |
| WO | 2014046757 | 3/2014 |
| WO | 2014101714 | 7/2014 |

(56) References Cited

FOREIGN PATENT DOCUMENTS

| | | |
|---|---|---|
| WO | 2014116947 | 7/2014 |
| WO | 2014138472 | 9/2014 |
| WO | 2014165286 | 10/2014 |
| WO | 2015021958 | 2/2015 |
| WO | 2015104263 | 7/2015 |
| WO | 2015155556 | 10/2015 |
| WO | 2016009423 | 1/2016 |
| WO | 2016015000 | 1/2016 |
| WO | 2016144765 | 9/2016 |

OTHER PUBLICATIONS

U.S. Appl. No. 15/060,953, filed Mar. 4, 2016, High.
U.S. Appl. No. 15/061,025, filed Mar. 4, 2016, Kay.
U.S. Appl. No. 15/061,054, filed Mar. 4, 2016, High.
U.S. Appl. No. 15/061,203, filed Mar. 4, 2016, High.
U.S. Appl. No. 15/061,265, filed Mar. 4, 2016, High.
U.S. Appl. No. 15/061,350, filed Mar. 4, 2016, High.
U.S. Appl. No. 15/061,402, filed Mar. 4, 2016, High.
U.S. Appl. No. 15/061,406, filed Mar. 4, 2016, High.
U.S. Appl. No. 15/061,474, filed Mar. 4, 2016, High.
U.S. Appl. No. 15/061,507, filed Mar. 4, 2016, High.
U.S. Appl. No. 15/061,671, filed Mar. 4, 2016, Taylor.
U.S. Appl. No. 15/061,677, filed Mar. 4, 2016, High.
U.S. Appl. No. 15/061,686, filed Mar. 4, 2016, Thompson.
U.S. Appl. No. 15/061,688, filed Mar. 4, 2016, High.
U.S. Appl. No. 15/061,722, filed Mar. 4, 2016, Atchley.
U.S. Appl. No. 15/061,770, filed Mar. 4, 2016, Winkle.
U.S. Appl. No. 15/061,792, filed Mar. 4, 2016, High.
U.S. Appl. No. 15/061,801, filed Mar. 4, 2016, Atchley.
U.S. Appl. No. 15/061,805, filed Mar. 4, 2016, High.
U.S. Appl. No. 15/061,844, filed Mar. 4, 2016, High.
U.S. Appl. No. 15/061,848, filed Mar. 4, 2016, McHale.
U.S. Appl. No. 15/061,908, filed Mar. 4, 2016, High.
U.S. Appl. No. 15/061,980, filed Mar. 4, 2016, Thompson.
Abbrobotics; "ABB Robotics—Innovative Packaging Solutions", https://www.youtube.com/watch?v=e5jif-IUvHY, published on May 16, 2013, pp. 1-5.
Ang, Fitzwatler, et al.; "Automated Waste Sorter With Mobile Robot Delivery Waste System", De La Salle University Research Congress 2013, Mar. 7-9, 2013, pp. 1-7.
Ansari, Sameer, et al.; "Automated Trash Collection & Removal in Office Cubicle Environments", Squad Collaborative Robots, Sep. 27, 2013, pp. 1-23.
Armstrong, Jean, et al.; "Visible Light Positioning: A Roadmap for International Standardization", IEEE Communications Magazine, Dec. 2013, pp. 2-7.
Artal, J.S., et al.; "Autonomous Mobile Robot with Hybrid PEM Fuel-Cell and Ultracapacitors Energy System, Dedalo 2.0", International Conference on Renewable Energies and Power Quality, Santiago de Compostela, Spain, Mar. 28-30, 2012, pp. 1-6.
Atherton, Kelsey D.; "New GPS Receiver Offers Navigation Accurate to an Inch", Popular Science, www.popsci.com/technology/article/2013-08/global-positioning-down-inches, Aug. 16, 2013, pp. 1-2.
Avezbadalov, Ariel, et al.; "Snow Shoveling Robot", engineering.nyu.edu/mechatronics/projects/ME3484/2006/Snow Shoveling Robot/Mechatronics Snow Robot Presentation Update Dec. 19, 2006.pdf, 2006, pp. 1-24.
Bares, John, et al.; "Designing Crash-Survivable Unmanned Vehicles", AUVSI Symposium, Jul. 10, 2002, pp. 1-15.
Bohren; Jonathan et al.; "Towards Autonomous Robotic Butlers: Lessons Learned with the PR2", Willow Garage, pp. 1-8.
Bouchard, Samuel; "A Robot to Clean Your Trash Bin!", Robotiq, http://blog.robotiq.com/bid/41203/A-Robot-to-Clean-your-Trash-Bin, Aug. 22, 2011, pp. 1-7.
Burns, Tom; "irobot roomba 780 review best robot vacuum floor cleaning robot review video demo", https://www.youtube.com/watch?v=MkwtlyVAaEY, published on Feb. 13, 2013, pp. 1-10.
Bytelight; "Scalable Indoor Location", http://www.bytelight.com/, Dec. 12, 2014, pp. 1-2.
Canadian Manufacturing; "Amazon unleashes army of order-picking robots", http://www.canadianmanufacturing.com/supply-chain/amazon-unleashes-army-order-picking-robots-142902/, Dec. 2, 2014, pp. 1-4.
Capel, Claudine; "Waste sorting—A look at the separation and sorting techniques in today's European market", Waste Management World, http://waste-management-world.com/a/waste-sorting-a-look-at-the-separation-and-sorting-techniques-in-todayrsquos-european-market, Jul. 1, 2008, pp. 1-8.
Carnegie Mellon Univeristy; "AndyVision—The Future of Retail", https://www.youtube.com/watch?v=n5309ILTV2s, published on Jul. 16, 2012, pp. 1-9.
Carnegie Mellon University; "Robots in Retail", www.cmu.edu/homepage/computing/2012/summer/robots-in-retail.shmtl, 2012, pp. 1.
Chopade, Jayesh, et al.; "Control of Spy Robot by Voice and Computer Commands", International Journal of Advanced Research in Computer and Communication Engineering, vol. 2, Issue 4, Apr. 2013, pp. 1-3.
Cnet; "iRobot Braava 380t—No standing ovation for this robotic floor mop", https://www.youtube.com/watch?v=JAtClxFtC6Q, published on May 7, 2014, pp. 1-6.
Coltin, Brian & Ventura, Rodrigo; "Dynamic User Task Scheduling for Mobile Robots", Association for the Advancement of Artificial Intelligence, 2011, pp. 1-6.
Couceiro, Micael S., et al.; "Marsupial teams of robots: deployment of miniature robots for swarm exploration under communication constraints", Robotica, Cambridge University Press, downloaded Jan. 14, 2014, pp. 1-22.
Coxworth, Ben; "Robot designed to sort trash for recycling", Gizmag, http://www.gizmag.com/robot-sorts-trash-for-recycling/18426/, Apr. 18, 2011, pp. 1-7.
Davis, Jo; "The Future of Retail: In Store Now", Online Brands, http://onlinebrands.co.nz/587/future-retail-store-now/, Nov. 16, 2014, pp. 1-5.
Denso; "X-mobility", pp. 1.
DHL; "Self-Driving Vehicles in Logistics: A DHL perspective on implications and use cases for the logistics industry", 2014, pp. 1-39.
Dorrier, Jason; "Service Robots Will Now Assist Customers at Lowe's Store", SingularityHUB, http://singularityhub.com/2014/10/29/service-robots-will-now-assist-customers-at-lowes-store/, Oct. 29, 2014, pp. 1-4.
DroneWatch; "Weatherproof Drone XAircraft Has 'Black Box'", DroneWatch, http://www.dronewatch.nl/2015/02/13/weatherproof-drone-van-xaircraft-beschikt-over-zwarte-doos/, Feb. 13, 2015, pp. 1-5.
Dyson US; "See the new Dyson 360 Eye robot vacuum cleaner in action #DysonRobot", https://www.youtube.com/watch?v=OadhulCDAjk, published on Sep. 4, 2014, pp. 1-7.
Edwards, Lin; "Supermarket robot to help the elderly (w/Video)", Phys.Org, http://phys.org/news/2009-12-supermarket-robot-elderly-video.html, Dec. 17, 2009, pp. 1-5.
Elfes, Alberto; "Using Occupancy Grids for Mobile Robot Perception and Navigation", IEEE, 1989, pp. 46-57.
Elkins, Herschel T.; "Important 2014 New Consumer Laws", County of Los Angeles Department of Consumer Affairs Community Outreach & Education, updated Jan. 6, 2014, pp. 1-46.
Falconer, Jason; "HOSPI-R drug delivery robot frees nurses to do more important work", Gizmag, http://www.gizmag.com/panasonic-hospi-r-delivery-robot/29565/, Oct. 28, 2013, pp. 1-6.
Falconer, Jason; "Toyota unveils helpful Human Support Robot", Gizmag, http:/www.gizmag.com/toyota-human-support-robot/24246/, Sep. 22, 2012, pp. 1-6.
Farivar, Cyrus; "This in-store robot can show you the hammer aisle, but not the bathroom", Ars Technica, http://arstechnica.com/business/2014/12/this-in-store-robot-can-show-you-the-hammer-aisle-but-not-the-bathroom/, Dec. 3, 2014, pp. 1-4.
Fellow Robots; "Meet OSHBOT", http://fellowrobots.com/oshbot/, pp. 1-3.

(56) References Cited

OTHER PUBLICATIONS

Fellowrobots; "Oshbot Progress—Fellow Robots", https://vimeo.com/139532370, published Sep. 16, 2015, pp. 1-5.
Fora.TV; "A Day in the Life of a Kiva Robot", https://www.youtube.com/watch?v=6KRjuuEVEZs, published on May 11, 2011, pp. 1-11.
Gamma2video; "FridayBeerBot.wmv", https://www.youtube.com/watch?v=KXXIIDYatxQ, published on Apr. 27, 2010, pp. 1-7.
Glas, Dylan F., et al.; "The Network Robot System: Enabling Social Human-Robot Interaction in Public Spaces", Journal of Human-Robot Interaction, vol. 1, No. 2, 2012, pp. 5-32.
Green, A., et al; "Report on evaluation of the robot trolley", CommRob IST-045441, Advanced Behaviour and High-Level Multimodal Communications with and among Robots, pp. 10-67.
Gross, H.-M., et al.; TOOMAS: Interactive Shopping Guide Robots in Everyday Use—Final Implementation and Experiences from Long-term Field Trials, Proc. IEEE/RJS Intern. Conf. on Intelligent Robots and Systems (IROS'09), St. Louis, USA, pp. 2005-2012.
Habib, Maki K., "Real Time Mapping and Dynamic Navigation for Mobile Robots", International Journal of Advanced Robotic Systems, vol. 4, No. 3, 2007, pp. 323-338.
HRJ3 Productions; "Japanese Automatic Golf Cart", https://www.youtube.com/watch?v=8diWYtqb6C0 published on Mar. 29, 2014, pp. 1-4.
Huang, Edward Y.C.; "A Semi-Autonomous Vision-Based Navigation System for a Mobile Robotic Vehicle", Thesis submitted to the Massachusetts Institute of Technology Department of Electrical Engineering and Computer Science on May 21, 2003, pp. 1-76.
IEEE Spectrum; "Warehouse Robots at Work", https://www.youtube.com/watch?v=lWsMdN7HMuA, published on Jul. 21, 2008, pp. 1-11.
Intelligent Autonomous Systems; "TUM James goes shopping", https://www.youtube.com/watch?v=JS2zycc4AUE, published on May 23, 2011, pp. 1-13.
Katic, M., Dusko; "Cooperative Multi Robot Systems for Contemporary Shopping Malls", Robotics Laboratory, Mihailo Pupin Institute, University of Belgrade, Dec. 30, 2010, pp. 10-17.
Kehoe, Ben, et al.; "Cloud-Based Robot Grasping with the Google Object Recognition Engine", 2013, pp. 1-7.
Kendricks, Cooper; "Trash Disposal Robot", https://prezi.com31acae05zf8i/trash-disposal-robot/, Jan. 9, 2015, pp. 1-7.
Kibria, Shafkat, "Speech Recognition for Robotic Control", Master's Thesis in Computing Science, Umea University, Dec. 18, 2005, pp. 1-77.
King, Rachael; "Newest Workers for Lowe's: Robots", The Wall Street Journal, http:/www.wsj.com/articles/newest-workers-for-lowes-robots-1414468866, Oct. 28, 2014, pp. 1-4.
Kitamura, Shunichi; "Super Golf Cart with Remote drive and NAVI system in Japan", https://www.youtube.com/watch?v=2_3-dUR12F8, published on Oct. 4, 2009, pp. 1-6.
Kiva Systems; "Automated Goods-to-Man Order Picking System—Kiva Systems", http://www.kivasystems.com/solutions/picking/, printed on Apr. 2, 2015, pp. 1-2.
Kiva Systems; "Frequently Asked Questions about Kiva Systems—Kiva Systems", http://kivasystems.com/about-us-the-kiva-approach/faq/, printed on Apr. 2, 2015, pp. 1-2.
Kiva Systems; "how a Kiva system makes use of the vertical space—Kiva Systems", http://www.kivasystems.com/solutions/vertical-storage/, printed on Apr. 2, 2015, pp. 1-2.
Kiva Systems; "How Kiva Systems and Warehouse Management Systems Interact", 2010, pp. 1-12.
Kiva Systems; "Kiva's warehouse automation system is the most powerful and flexible A . . . ", http://www.kivasystems.com/solutions/, printed on Apr. 2, 2015, pp. 1-2.
Kiva Systems; "Kiva replenishment is more productive and accurate than replenishing pick faces in traditional distribution operations", http://www.kivasystems.com/solutions/replenishment/, printed on Apr. 2, 2015, pp. 1-2.
Kiva Systems; "Kiva warehouse control software, Kiva WCS—Kiva Systems", http://www.kivasystems.com/solutions/software/, printed on Apr. 2, 2015, pp. 1-2.
Kiva Systems; "Shipping Sortation—Kiva Systems", http://www.kivasystems.com/solutions/shipping-sortation/, printed on Apr. 2, 2015, pp. 1-2.
Kohtsuka, Takafumi, et al.; "Design of a Control System for Robot Shopping Carts", Knowledge-Based and Intelligent Information and Engineering Systems, 15th International Conference, KES 2011, Kaiserslautern, Germany, Sep. 12-14, 2011, pp. 280-288.
Koubaa, Anis; "A Service-Oriented Architecture for Virtualizing Robots in Robot-as-a-Service Clouds", pp. 1-13.
Kumar, Swagat; "Robotics-as-a-Service: Transforming the Future of Retail", Tata Consultancy Services, http://www.tcs.com/resources/white_papers/Pages/Robotics-as-a-Service.aspx, printed on May 13, 2015, pp. 1-4.
Kumar Paradkar, Prashant; "Voice Controlled Robotic Project using interfacing of Andruino and Bluetooth HC-05", Robotics_Projects_C/C++_Android.
Lejepekov, Fedor; "Yuki-taro. Snow recycle robot.", https://www.youtube.com/watch?v=gl2j9PY4jGY, published on Jan. 17, 2011, pp. 1-4.
Liu, Xiaohan, et al.; "Design of an Indoor Self-Positioning System for the Visually Impaired—Simulation with RFID and Bluetooth in a Visible Light Communication System", Proceedings of the 29th Annual International Conference of the IEEE EMBS, Cite Internationale, Lyon, France, Aug. 23-26, 2007, pp. 1655-1658.
Lowe's Home Improvement; "OSHbots from Lowe's Innovation Labs", https://www.youtube.com/watch?v=W-RKAjP1dtA, published on Dec. 15, 2014, pp. 1-8.
Lowe's Innovation Labs; "Autonomous Retail Service Robots", http://www.lowesinnovationlabs.com/innovation-robots/, printed on Feb. 26, 2015, pp. 1-4.
Matos, Luis; "wi-Go—The autonomous and self-driven shopping cart"; https://www.indiegogo.com/projects/wi-go-the-autonomous-and-self-driven-shopping-cart; printed on Feb. 27, 2015, pp. 1-16.
Meena, M., & Thilagavahi, P.; "Automatic Docking System with Recharging and Battery Replacement for Surveillance Robot", International Journal of Electronics and Computer Science Engineering, pp. 1148-1154.
Murph, Darren; "B.O.S.S. shopping cart follows you around", Engadget, http://www.engadget.com/2006/08/11/b-o-s-s-shopping-cart-follows-you-around/, Aug. 11, 2006, pp. 1-4.
Nakajima, Madoka & Haruyama, Shinichiro; "New indoor navigation system for visually impaired people using visible light communication", EURASIP Journal on Wireless Communications and Networking, 2013, pp. 1-10.
NEUROBTV; "Shopping Robot TOOMAS 2009", https://www.youtube.com/watch?v=49Pkm30qmQU, published on May 8, 2010, pp. 1-7.
Nickerson, S.B., et al.; "An autonomous mobile robot for known industrial environments", Autonomous Robot for a Known environment, Aug. 28, 1997, pp. 1-28.
O'Donnell, Jake; "Meet the Bluetooth-Connected Self-Following Robo-Caddy of the Future", Sportsgrid; http://www.sportsgrid.com/uncategorized/meet-the-bluetooth-connected-self-following-robo-caddy-of-the-future/, Apr. 22, 2014, pp. 1-5.
Ogawa, Keisuke; "Denso Demos In-wheel Motor System for Baby Carriages, Shopping Carts", Nikkei Technology, http://techon.nikkeiibp.co.jp/english/NEWS_EN/20141010/381880/?ST=english_PRINT, Oct. 10, 2014, pp. 1-2.
Orchard Supply Hardware; "Orchard Supply Hardware's OSHbot", https://www.youtube.com/watch?v=Sp9176vm7Co, published on Oct. 28, 2014, pp. 1-9.
Osborne, Charlie; "Smart Cart Follows You When Grocery Shopping", Smartplanet, http://www.smartplanet.com/blog/smart-takes/smart-cart-follows-you-when-grocery-shopping/, Feb. 29, 2012, pp. 1-4.
Poudel, Dev Bahadur; "Coordinating Hundreds of Cooperative, Autonomous Robots in a Warehouse", Jan. 27, 2013, pp. 1-13.
Robotlab Inc.; "NAO robot drives autonomously it's own car", https://www.youtube.com/watch?v=oBHYwYlo1UE, published on Sep. 8, 2014, pp. 1-6.

(56) References Cited

OTHER PUBLICATIONS

Rodriguez, Ashley; "Meet Lowe's Newest Sales Associate—OSHbot, the Robot", Advertising Age, http://adage.com/article/cmo-strategy/meet-lowe-s-newest-sales-associate-oshbot-robot/295591/, Oct. 28, 2014, pp. 1-8.
Sebaali, G., et al.; "Smart Shopping Cart", Department of Electrical and Computer Engineering, American University of Beirut, pp. 1-6.
Shukla, Neha; "SaviOne the Butler Bot: Service Robot for Hospitality Industry", TechieTonics, http://www.techietonics.com/robo-tonics/savione-the-butler-bot-service-for-hospitality-industry.html, pp. 1-5.
Song, Guangming, et al.; "Automatic Docking System for Recharging Home Surveillance Robots", http://www.academia.edu/6495007/Automatic_Docking_System_for_Recharging_Home_Surveillance_Robots, IEEE Transactions on Consumer Electronics, vol. 57, No. 2, May 2011, pp. 1-8.
Soper, Taylor; "Amazon vet's new robot-powered apparel startup aims to revolutionize how we buy clothes", GeekWire, http://www.geekwire.com/2012/hointer-robot-jeans-clothing-apparel-store-startup/, Nov. 29, 2012, pp. 1-12.
Stewart Golf; "Introducing the NEW Stewart Golf X9 Follow", https://www.youtube.com/watch?v=HHivFGtiuE, published on Apr. 9, 2014, pp. 1-9.
Sun, Eric; "Smart Bin & Trash Route" system—RMIT 2012 Green Inventors Competition, http://www.youtube.com/watch?v=OrTA57aIO0k, published on Nov. 14, 2012, pp. 1-8.
Superdroid Robots; "Cool Robots, Making Life Easier", http://www.superdroidrobots.com/shop/custom.aspx/cool-robots-making-life-easier/83/, printed on Jun. 16, 2015, pp. 1-7.
Swisslog; "RoboCourier Autonomous Mobile Robot", http://www.swisslog.com/en/Products/HCS/Automated-Material-Transport/RoboCourier-Autonomous-Mobile-Robot, pp. 1.
Tam, Donna; "Meet Amazon's busiest employee—the Kiva robot", CNET, http://www.cnet.com/news/meet-amazons-busiest-employee-the-kiva-robot/, Nov. 30, 2014, pp. 1-6.
Universal Robotics; "Neocortex Enables Random Part Handling and Automated Assembly", http://www.universalrobotics.com/random-bin-picking, printed on Dec. 22, 2015, pp.-1-3.
Uphigh Productions; "Behold the Future (E017 Robot Sales Assistant)", https://www.youtube.com/watch?v=8WbvjaPm7d4, published on Nov. 19, 2014, pp. 1-7.
Urankar, Sandeep, et al.; "Robo-Sloth: A Rope-Climbing Robot", Department of Mechanical Engineering, Indian Institute of Technology, 2003, pp. 1-10.
Vasilescu, Iuliu, et al.; "Autonomous Modular Optical Underwater Robot (AMOUR) Design, Prototype and Feasibility Study", pp. 1-7.
VMECAvacuumtech; "VMECA Magic Suction Cup with ABB robot for pick and place (packaging application)", https://www.youtube.com/watch?v=5btR9MLtGJA, published on Sep. 14, 2014, pp. 1-4.
Wang, Xuan; "2D Mapping Solutions for Low Cost Mobile Robot", Master's Thesis in Computer Science, Royal Institute of Technology, KTH CSC, Stockholm, Sweden, 2013, pp. 1-60.
Webb, Mick; "Robovie II—the personal robotic shopping", Gizmag, http://www.gizmag.com/robovie-ii-robotic-shopping-assistance/13664/, Dec. 23, 2009, pp. 1-5.
Weise, Elizabeth; "15,000 robots usher in Amazon's Cyber Monday", USAtoday, http://www.usatoday.com/story/tech/2014/12/01/robots-amazon.kiva-fulfillment-centers-cyber-monday/19725229/, Dec. 2, 2014, pp. 1-3.
Weiss, C.C.; "Multifunctional hybrid robot shovels snow and mows your lawn", Gizmag, http://www.gizmag.com/snowbyte-snow-shoveling-robot/32961/, Jul. 21, 2014, pp. 1-7.
Wikipedia; "Kiva Systems", http://en.wikipedia.org/wiki/Kiva_Systems, printed on Apr. 2, 2015, pp. 1-3.
Wired; "High-Speed Robots Part 1: Meet BettyBot in "Human Exclusion Zone" Warehouses—The Window—Wired", https://www.youtube.com/watch?v=8gy5tYVR-28, published on Jul. 2, 2013, pp. 1-6.
Wulf, O., et al.; "Colored 2D maps for robot navigation with 3D sensor data," Institute for Systems Engineering, University of Hannover, Hannover, Germany, 2014, pp. 1-6.
YRF; "The Diamond Robbery—Scene Dhoom:2 Hrithik Roshan", https://www.youtube.com/watch?v=3bMYgo_S0Kc, published on Jul. 12, 2012, pp. 1-7.
Kohtsuka, T. et al.; "Design of a Control System for Robot Shopping Carts"; KES'11 Proceedings of the 15th International Conference on Knowledge-Based and Intelligent Information and Engineering Systems; Sep. 12-14, 2011; pp. 280-288.
Nishimura, S. et al.; "Development of Attachable Modules for Robotizing Daily Items: Person Following Shopping Cart Robot"; Proceedings of the 2007 IEEE International Conference on Robotics and Biomimetics (Sanya, China); Dec. 14-18, 2007; pp. 1506-1511.
Scholz, J. et al.; "Cart Pushing with a Mobile Manipulation System: Towards Navigation with Moveable Objects"; Proceedings of the 2011 IEEE International Conference on Robotics and Automation (Shanghai, China); May 9-13, 2011; pp. 6115-6120.
Bohren; Jonathan et al.; "Towards Autonomous Robotic Butlers: Lessons Learned with the PR2", Willow Garage, May 9, 2011, pp. 1-8.
Denso; "X-mobility", Oct. 10, 2014, pp. 1-2, including machine translation.
Fellow Robots; "Meet OSHBOT", http://fellowrobots.com/oshbot/, May 19, 2015, pp. 1-3.
Green, A., et al; "Report on evaluation of the robot trolley", CommRob IST-045441, Advanced Behaviour and High-Level Multimodal Communications with and among Robots, Jun. 14, 2010, pp. 10-67.
Koubaa, Anis; "A Service-Oriented Architecture for Virtualizing Robots in Robot-as-a-Service Clouds", 2014, pp. 1-13.
Kumar Paradkar, Prashant; "Voice Controlled Robotic Project using interfacing of Ardruino and Bluetooth HC-05", Robotics_Projects_C/C++_Android, Jan. 23, 2016, pp. 1-14.
Meena, M., & Thilagavathi, P.; "Automatic Docking System with Recharging and Battery Replacement for Surveillance Robot", International Journal of Electronics and Computer Science Engineering, 2012, pp. 1148-1154.
Sebaali, G., et al.; "Smart Shopping Cart", Department of Electrical and Computer Engineering, American University of Beirut, 2014, pp. 1-6.
Shukla, Neha; "SaviOne the Butler Bot: Service Robot for Hospitality Industry", TechieTonics, http://www.techietonics.com/robo-tonics/savione-the-butler-bot-service-for-hospitality-industry.html, Aug. 14, 2014, pp. 1-5.
Swisslog; "RoboCourier Autonomous Mobile Robot", http://www.swisslog.com/en/Products/HCS/Automated-Material-Transport/RoboCourier-Autonomous-Mobile-Robot, printed May 27, 2015, pp. 1.
Vasilescu, Iuliu, et al.; "Autonomous Modular Optical Underwater Robot (AMOUR) Design, Prototype and Feasibility Study", Apr. 18, 2005, pp. 1-7.
Wikipedia; "Leeds Kirkgate Market"; https://en.wikipedia.org/wiki/Leeds_Kirkgate_Market; Retrieved on Apr. 5, 2017; 8 pages.
Budgee; "The Robotic Shopping Cart Budgee "; https://www.youtube.com/watch? v=2dYNdVPF4VM; published on Mar. 20, 2015; pp. 1-6.
Follow Inspiration; "wiiGO"; https://www.youtube.com/watch?v=dhHXIdpknC4; published on Jun. 16, 2015; pp. 1-7.
Garun, Natt; "Hop the hands-free suitcase follows you around like an obedient pet"; https://www.digitaltrends.com/cool-tech/hop-the-hands-free-suitcase-follows-you-around-like-an-obedient-pet/; Oct. 10, 2012; pp. 1-6.
Onozato, Taishi et al.; "A Control System for the Robot Shopping Cart"; 2010 IRAST International Congress on Computer Applications and Computational Science (CACS 2010); 2010; pp. 907-910.
SK Telecom Co.; "SK Telecom Launches Smart Cart Pilot Test in Korea"; http://www.sktelecom.com/en/press/press_detail.do?idx=971; Oct. 4, 2011; pp. 1-2.
Technion; "Autonomous Tracking Shopping Cart—Shopping Made Easy from Technion"; https://www.youtube.com/watch?v=pQcb9fofmXg; published on Nov. 23, 2014; pp. 1-10.

(56) References Cited

OTHER PUBLICATIONS

Daily Mail; "Dancing with your phone: The gyrating robotic dock that can move along with your music", Sep. 12, 2012, http://www.dailymail.co.uk/sciencetech/article-2202164/The-intelligent-dancing-robot-controlled-mobile-phone.html, pp. 1-23.
Messieh, Nancy; "Humanoid robots will be roaming Abu Dhabi's malls next year", The Next Web, Oct. 17, 2011, https://thenextweb.com/me/2011/10/17/humanoid-robots-will-be-roaming-abu-dhabis-malls-next-year/, pp. 1-6.
Owano, Nancy; "HEARBO robot can tell beeps, notes, and spoken word (w/ Video)", Phys.org, Nov. 21, 2012, https://phys.org/news/2012-11-hearbo-robot-beeps-spoken-word.html, pp. 1-4.
Sales, Jorge, et al.; "CompaRob: The Shopping Cart Assistance Robot", International Journal of Distributed Sensor Networks, vol. 2016, Article ID 4781280, Jan. 3, 2016, http://dx.doi.org/10.1155/2016/4781280, pp. 1-16.

\* cited by examiner

RECHARGING APPARATUS AND METHOD

RELATED APPLICATIONS

This application claims the benefit of each of the following U.S. Provisional applications, each of which is incorporated herein by reference in its entirety: U.S. Provisional Application No. 62/129,726, filed Mar. 6, 2015, U.S. Provisional Application No. 62/129,727, filed Mar. 6, 2015, U.S. Provisional Application No. 62/138,877, filed Mar. 26, 2015, U.S. Provisional Application No. 62/138,885, filed Mar. 26, 2015, U.S. Provisional Application No. 62/152,421, filed Apr. 24, 2015, U.S. Provisional Application No. 62/152,465, filed Apr. 24, 2015, U.S. Provisional Application No. 62/152,440, filed Apr. 24, 2015, U.S. Provisional Application No. 62/152,630, filed Apr. 24, 2015, U.S. Provisional Application No. 62/152,711, filed Apr. 24, 2015, U.S. Provisional Application No. 62/152,610, filed Apr. 24, 2015, U.S. Provisional Application No. 62/152,667, filed Apr. 24, 2015, U.S. Provisional Application No. 62/157,388, filed May 5, 2015, U.S. Provisional Application No. 62/165,579, filed May 22, 2015, U.S. Provisional Application No. 62/165,416, filed May 22, 2015, U.S. Provisional Application No. 62/165,586, filed May 22, 2015, U.S. Provisional Application No. 62/171,822, filed Jun. 5, 2015, U.S. Provisional Application No. 62/175,182, filed Jun. 12, 2015, U.S. Provisional Application No. 62/182,339, filed Jun. 19, 2015, U.S. Provisional Application No. 62/185,478, filed Jun. 26, 2015, U.S. Provisional Application No. 62/194,131, filed Jul. 17, 2015, U.S. Provisional Application No. 62/194,119, filed Jul. 17, 2015, U.S. Provisional Application No. 62/194,121, filed Jul. 17, 2015, U.S. Provisional Application No. 62/194,127, filed Jul. 17, 2015, U.S. Provisional Application No. 62/202,744, filed Aug. 7, 2015, U.S. Provisional Application No. 62/202,747, filed Aug. 7, 2015, U.S. Provisional Application No. 62/205,548, filed Aug. 14, 2015, U.S. Provisional Application No. 62/205,569, filed Aug. 14, 2015, U.S. Provisional Application No. 62/205,555, filed Aug. 14, 2015, U.S. Provisional Application No. 62/205,539, filed Aug. 14, 2015, U.S. Provisional Application No. 62/207,858, filed Aug. 20, 2015, U.S. Provisional Application No. 62/214,826, filed Sep. 4, 2015, U.S. Provisional Application No. 62/214,824, filed Sep. 4, 2015, U.S. Provisional Application No. 62/292,084, filed Feb. 5, 2016, U.S. Provisional Application No. 62/302,547, filed Mar. 2, 2016, U.S. Provisional Application No. 62/302,567, filed Mar. 2, 2016, U.S. Provisional Application No. 62/302,713, filed Mar. 2, 2016, and U.S. Provisional Application No. 62/303,021, filed Mar. 3, 2016.

TECHNICAL FIELD

These teachings relate generally to shopping environments and more particularly to devices, systems and methods for assisting customers and/or workers in those shopping environments.

BACKGROUND

In a modern retail store environment, there is a need to improve the customer experience and/or convenience for the customer. Whether shopping in a large format (big box) store or smaller format (neighborhood) store, customers often require assistance that employees of the store are not always able to provide. For example, particularly during peak hours, there may not be enough employees available to assist customers such that customer questions go unanswered. Additionally, due to high employee turnover rates, available employees may not be fully trained or have access to information to adequately support customers. Other routine tasks also are difficult to keep up with, particularly during peak hours. For example, shopping carts are left abandoned, aisles become messy, inventory is not displayed in the proper locations or is not even placed on the sales floor, shelf prices may not be properly set, and theft is hard to discourage. All of these issues can result in low customer satisfaction or reduced convenience to the customer. With increasing competition from non-traditional shopping mechanisms, such as online shopping provided by e-commerce merchants and alternative store formats, it can be important for "brick and mortar" retailers to focus on improving the overall customer experience and/or convenience.

BRIEF DESCRIPTION OF THE DRAWINGS

The above needs are at least partially met through provision of embodiments of systems, devices, and methods designed to provide assistance to customers and/or workers in a shopping facility, such as described in the following detailed description, particularly when studied in conjunction with the drawings, wherein.

Figure 1:
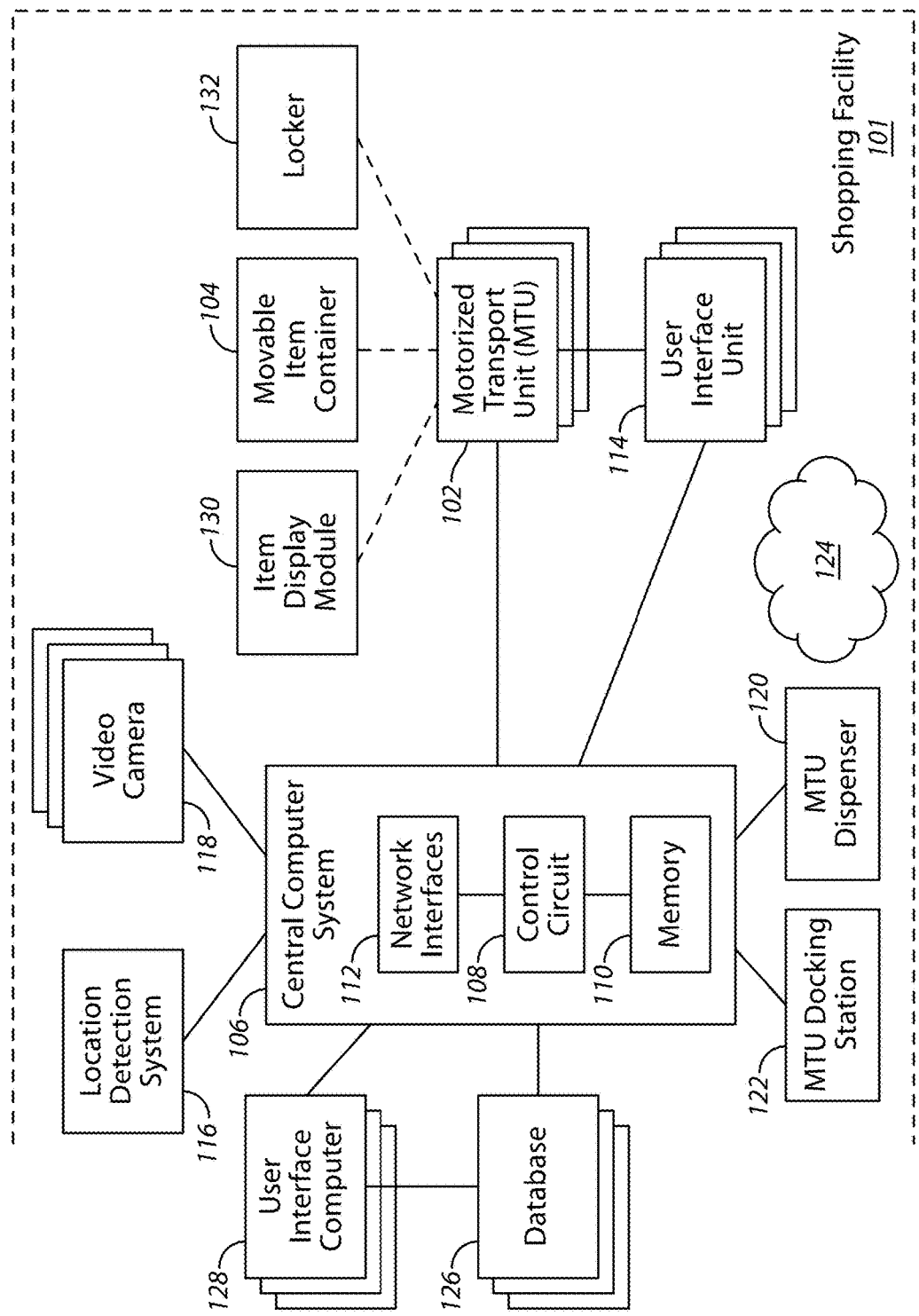
FIG. 1 comprises a block diagram of a shopping assistance system as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally speaking, pursuant to various embodiments, systems, devices and methods are provided for assistance of persons at a shopping facility. Generally, assistance may be provided to customers or shoppers at the facility and/or to workers at the facility. The facility may be any type of shopping facility at a location in which products for display and/or for sale are variously distributed throughout the shopping facility space. The shopping facility may be a retail sales facility, or any other type of facility in which products are displayed and/or sold. The shopping facility may include one or more of sales floor areas, checkout locations (i.e., point of sale (POS) locations), customer service areas other than checkout locations (such as service areas to handle returns), parking locations, entrance and exit areas, stock room areas, stock receiving areas, hallway areas, common areas shared by merchants, and so on. Generally, a shopping facility includes areas that may be dynamic in terms of the physical structures occupying the space or area and objects, items, machinery and/or persons moving in the area. For example, the sales floor area may include product storage units, shelves, racks, modules, bins, etc., and other walls, dividers, partitions, etc. that may be configured in different layouts or physical arrangements. In other example, persons or other movable objects may be freely and independently traveling through the shopping facility space. And in another example, the persons or movable objects move according to known travel patterns and timing. The facility may be any size of format facility, and may include products from one or more merchants. For example, a facility may be a single store operated by one merchant or may be a collection of stores covering multiple merchants such as a mall. Generally, the system makes use of automated, robotic mobile devices, e.g., motorized transport units, that are capable of self-powered movement through a space of the shopping facility and providing any number of functions. Movement and operation of such devices may be controlled by a central computer system or may be autonomously controlled by the motorized transport units themselves. Various embodiments provide one or more user interfaces to allow various users to interact with the system including the automated mobile devices and/or to directly interact with the automated mobile devices. In some embodiments, the automated mobile devices and the corresponding system serve to enhance a customer shopping experience in the shopping facility, e.g., by assisting shoppers and/or workers at the facility.

In some embodiments, a shopping facility personal assistance system comprises: a plurality of motorized transport units located in and configured to move through a shopping facility space; a plurality of user interface units, each corresponding to a respective motorized transport unit during use of the respective motorized transport unit; and a central computer system having a network interface such that the central computer system wirelessly communicates with one or both of the plurality of motorized transport units and the plurality of user interface units, wherein the central computer system is configured to control movement of the plurality of motorized transport units through the shopping facility space based at least on inputs from the plurality of user interface units.

System Overview

Referring now to the drawings, FIG. 1 illustrates embodiments of a shopping facility assistance system 100 that can serve to carry out at least some of the teachings set forth herein. It will be understood that the details of this example are intended to serve in an illustrative capacity and are not necessarily intended to suggest any limitations as regards the present teachings. It is noted that generally, FIGS. 1-5 describe the general functionality of several embodiments of a system, and FIGS. 6-10 expand on some functionalities of some embodiments of the system and/or embodiments independent of such systems.

In the example of FIG. 1, a shopping assistance system 100 is implemented in whole or in part at a shopping facility 101. Generally, the system 100 includes one or more motorized transport units (MTUs) 102; one or more item containers 104; a central computer system 106 having at least one control circuit 108, at least one memory 110 and at least one network interface 112; at least one user interface unit 114; a location determination system 116; at least one video camera 118; at least one motorized transport unit (MTU) dispenser 120; at least one motorized transport unit (MTU) docking station 122; at least one wireless network 124; at least one database 126; at least one user interface computer device 128; an item display module 130; and a locker or an item storage unit 132. It is understood that more or fewer of such components may be included in different embodiments of the system 100.

These motorized transport units 102 are located in the shopping facility 101 and are configured to move throughout the shopping facility space. Further details regarding such motorized transport units 102 appear further below. Generally speaking, these motorized transport units 102 are configured to either comprise, or to selectively couple to, a corresponding movable item container 104. A simple example of an item container 104 would be a shopping cart as one typically finds at many retail facilities, or a rocket cart, a flatbed cart or any other mobile basket or platform that may be used to gather items for potential purchase.

In some embodiments, these motorized transport units 102 wirelessly communicate with, and are wholly or largely controlled by, the central computer system 106. In particular, in some embodiments, the central computer system 106 is configured to control movement of the motorized transport units 102 through the shopping facility space based on a variety of inputs. For example, the central computer system 106 communicates with each motorized transport unit 102 via the wireless network 124 which may be one or more wireless networks of one or more wireless network types (such as, a wireless local area network, a wireless personal area network, a wireless mesh network, a wireless star network, a wireless wide area network, a cellular network, and so on), capable of providing wireless coverage of the desired range of the motorized transport units 102 according to any known wireless protocols, including but not limited to a cellular, Wi-Fi, Zigbee or Bluetooth network.

By one approach the central computer system 106 is a computer based device and includes at least one control circuit 108, at least one memory 110 and at least one wired and/or wireless network interface 112. Such a control circuit 108 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here. This control circuit 108 is configured (for example, by using corresponding programming stored in the memory 110 as will be well understood by those skilled in the art) to carry out one or more of the steps, actions, and/or functions described herein.

In this illustrative example the control circuit 108 operably couples to one or more memories 110. The memory 110 may be integral to the control circuit 108 or can be physically discrete (in whole or in part) from the control circuit 108 as desired. This memory 110 can also be local with respect to the control circuit 108 (where, for example, both share a common circuit board, chassis, power supply, and/or housing) or can be partially or wholly remote with respect to the control circuit 108 (where, for example, the memory 110 is physically located in another facility, metropolitan area, or even country as compared to the control circuit 108).

This memory 110 can serve, for example, to non-transitorily store the computer instructions that, when executed by the control circuit 108, cause the control circuit 108 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

Additionally, at least one database 126 may be accessible by the central computer system 106. Such databases may be integrated into the central computer system 106 or separate from it. Such databases may be at the location of the shopping facility 101 or remote from the shopping facility 101. Regardless of location, the databases comprise memory to store and organize certain data for use by the central control system 106. In some embodiments, the at least one database 126 may store data pertaining to one or more of: shopping facility mapping data, customer data, customer shopping data and patterns, inventory data, product pricing data, and so on.

In this illustrative example, the central computer system 106 also wirelessly communicates with a plurality of user interface units 114. These teachings will accommodate a variety of user interface units including, but not limited to, mobile and/or handheld electronic devices such as so-called smart phones and portable computers such as tablet/pad-styled computers. Generally speaking, these user interface units 114 should be able to wirelessly communicate with the central computer system 106 via a wireless network, such as the wireless network 124 of the shopping facility 101 (such as a Wi-Fi wireless network). These user interface units 114 generally provide a user interface for interaction with the system. In some embodiments, a given motorized transport unit 102 is paired with, associated with, assigned to or otherwise made to correspond with a given user interface unit 114. In some embodiments, these user interface units 114 should also be able to receive verbally-expressed input from a user and forward that content to the central computer system 106 or a motorized transport unit 102 and/or convert that verbally-expressed input into a form useful to the central computer system 106 or a motorized transport unit 102.

By one approach at least some of the user interface units 114 belong to corresponding customers who have come to the shopping facility 101 to shop. By another approach, in lieu of the foregoing or in combination therewith, at least some of the user interface units 114 belong to the shopping facility 101 and are loaned to individual customers to employ as described herein. In some embodiments, one or more user interface units 114 are attachable to a given movable item container 104 or are integrated with the movable item container 104. Similarly, in some embodiments, one or more user interface units 114 may be those of shopping facility workers, belong to the shopping facility 101 and are loaned to the workers, or a combination thereof.

In some embodiments, the user interface units 114 may be general purpose computer devices that include computer programming code to allow it to interact with the system 106. For example, such programming may be in the form of an application installed on the user interface unit 114 or in the form of a browser that displays a user interface provided by the central computer system 106 or other remote computer or server (such as a web server). In some embodiments, one or more user interface units 114 may be special purpose devices that are programmed to primarily function as a user interface for the system 100. Depending on the functionality and use case, user interface units 114 may be operated by customers of the shopping facility or may be operated by workers at the shopping facility, such as facility employees (associates or colleagues), vendors, suppliers, contractors, etc.

By one approach, the system 100 optionally includes one or more video cameras 118. Captured video imagery from such a video camera 118 can be provided to the central computer system 106. That information can then serve, for example, to help the central computer system 106 determine a present location of one or more of the motorized transport units 102 and/or determine issues or concerns regarding automated movement of those motorized transport units 102 in the shopping facility space. As one simple example in these regards, such video information can permit the central computer system 106, at least in part, to detect an object in a path of movement of a particular one of the motorized transport units 102.

By one approach these video cameras 118 comprise existing surveillance equipment employed at the shopping facility 101 to serve, for example, various security purposes. By another approach these video cameras 118 are dedicated to providing video content to the central computer system 106 to facilitate the latter's control of the motorized transport units 102. If desired, the video cameras 118 can have a selectively movable field of view and/or zoom capability that the central computer system 106 controls as appropriate to help ensure receipt of useful information at any given moment.

In some embodiments, a location detection system 116 is provided at the shopping facility 101. The location detection system 116 provides input to the central computer system 106 useful to help determine the location of one or more of the motorized transport units 102. In some embodiments, the location detection system 116 includes a series of light sources (e.g., LEDs (light-emitting diodes)) that are mounted in the ceiling at known positions throughout the space and that each encode data in the emitted light that identifies the source of the light (and thus, the location of the light). As a given motorized transport unit 102 moves through the space, light sensors (or light receivers) at the motorized transport unit 102, on the movable item container 104 and/or at the user interface unit 114 receive the light and can decode the data. This data is sent back to the central computer system 106 which can determine the position of the motorized transport unit 102 by the data of the light it receives, since it can relate the light data to a mapping of the light sources to locations at the facility 101. Generally, such lighting systems are known and commercially available, e.g., the ByteLight system from ByteLight of Boston, Mass. In embodiments using a ByteLight system, a typical display screen of the typical smart phone device can be used as a light sensor or light receiver to receive and process data encoded into the light from the ByteLight light sources.

In other embodiments, the location detection system 116 includes a series of low energy radio beacons (e.g., Bluetooth low energy beacons) at known positions throughout the space and that each encode data in the emitted radio signal that identifies the beacon (and thus, the location of the beacon). As a given motorized transport unit 102 moves through the space, low energy receivers at the motorized transport unit 102, on the movable item container 104 and/or at the user interface unit 114 receive the radio signal and can decode the data. This data is sent back to the central computer system 106 which can determine the position of the motorized transport unit 102 by the location encoded in the radio signal it receives, since it can relate the location data to a mapping of the low energy radio beacons to locations at the facility 101. Generally, such low energy radio systems are known and commercially available. In embodiments using a Bluetooth low energy radio system, a typical Bluetooth radio of a typical smart phone device can be used as a receiver to receive and process data encoded into the Bluetooth low energy radio signals from the Bluetooth low energy beacons.

In still other embodiments, the location detection system 116 includes a series of audio beacons at known positions throughout the space and that each encode data in the emitted audio signal that identifies the beacon (and thus, the location of the beacon). As a given motorized transport unit 102 moves through the space, microphones at the motorized transport unit 102, on the movable item container 104 and/or at the user interface unit 114 receive the audio signal and can decode the data. This data is sent back to the central computer system 106 which can determine the position of the motorized transport unit 102 by the location encoded in the audio signal it receives, since it can relate the location data to a mapping of the audio beacons to locations at the facility 101. Generally, such audio beacon systems are known and commercially available. In embodiments using an audio beacon system, a typical microphone of a typical smart phone device can be used as a receiver to receive and process data encoded into the audio signals from the audio beacon.

Also optionally, the central computer system 106 can operably couple to one or more user interface computers 128 (comprising, for example, a display and a user input interface such as a keyboard, touch screen, and/or cursor-movement device). Such a user interface computer 128 can permit, for example, a worker (e.g., an associate, analyst, etc.) at the retail or shopping facility 101 to monitor the operations of the central computer system 106 and/or to attend to any of a variety of administrative, configuration or evaluation tasks as may correspond to the programming and operation of the central computer system 106. Such user interface computers 128 may be at or remote from the location of the facility 101 and may access one or more the databases 126.

In some embodiments, the system 100 includes at least one motorized transport unit (MTU) storage unit or dispenser 120 at various locations in the shopping facility 101. The dispenser 120 provides for storage of motorized transport units 102 that are ready to be assigned to customers and/or workers. In some embodiments, the dispenser 120 takes the form of a cylinder within which motorized transports units 102 are stacked and released through the bottom of the dispenser 120. Further details of such embodiments are provided further below. In some embodiments, the dispenser 120 may be fixed in location or may be mobile and capable of transporting itself to a given location or utilizing a motorized transport unit 102 to transport the dispenser 120, then dispense one or more motorized transport units 102.

In some embodiments, the system 100 includes at least one motorized transport unit (MTU) docking station 122. These docking stations 122 provide locations where motorized transport units 102 can travel and connect to. For example, the motorized transport units 102 may be stored and charged at the docking station 122 for later use, and/or may be serviced at the docking station 122.

In accordance with some embodiments, a given motorized transport unit 102 detachably connects to a movable item container 104 and is configured to move the movable item container 104 through the shopping facility space under control of the central computer system 106 and/or the user interface unit 114. For example, a motorized transport unit 102 can move to a position underneath a movable item container 104 (such as a shopping cart, a rocket cart, a flatbed cart, or any other mobile basket or platform), align itself with the movable item container 104 (e.g., using sensors) and then raise itself to engage an undersurface of the movable item container 104 and lift a portion of the movable item container 104. Once the motorized transport unit is cooperating with the movable item container 104 (e.g., lifting a portion of the movable item container), the motorized transport unit 102 can continue to move throughout the facility space 101 taking the movable item container 104 with it. In some examples, the motorized transport unit 102 takes the form of the motorized transport unit 202 of FIGS. 2A-3B as it engages and detachably connects to a given movable item container 104. It is understood that in other embodiments, the motorized transport unit 102 may not lift a portion of the movable item container 104, but that it removably latches to, connects to or otherwise attaches to a portion of the movable item container 104 such that the movable item container 104 can be moved by the motorized transport unit 102. For example, the motorized transport unit 102 can connect to a given movable item container using a hook, a mating connector, a magnet, and so on.

In addition to detachably coupling to movable item containers 104 (such as shopping carts), in some embodiments, motorized transport units 102 can move to and engage or connect to an item display module 130 and/or an item storage unit or locker 132. For example, an item display module 130 may take the form of a mobile display rack or shelving unit configured to house and display certain items for sale. It may be desired to position the display module 130 at various locations within the shopping facility 101 at various times. Thus, one or more motorized transport units 102 may move (as controlled by the central computer system 106) underneath the item display module 130, extend upward to lift the module 130 and then move it to the desired location. A storage locker 132 may be a storage device where items for purchase are collected and placed therein for a customer and/or worker to later retrieve. In some embodiments, one or more motorized transport units 102 may be used to move the storage locker to a desired location in the shopping facility 101. Similar to how a motorized transport unit engages a movable item container 104 or item display module 130, one or more motorized transport units 102 may move (as controlled by the central computer system 106) underneath the storage locker 132, extend upward to lift the locker 132 and then move it to the desired location.

Figure 2A:
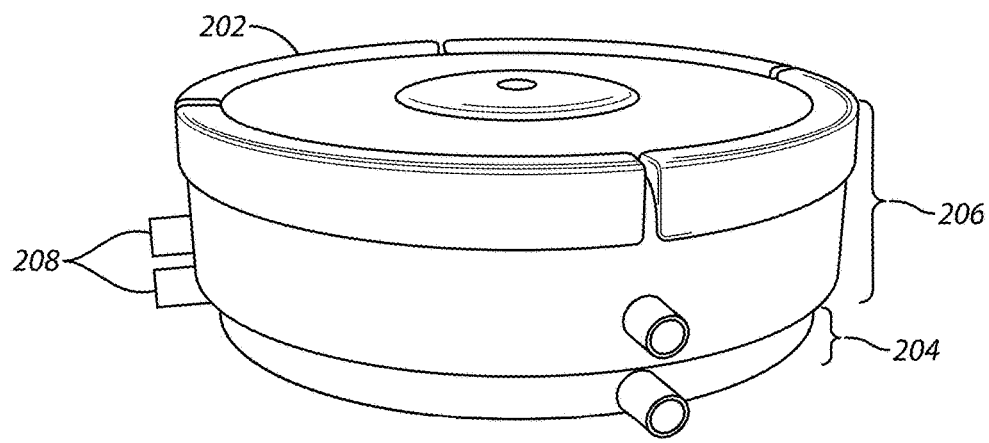
FIGS. 2A and 2B are illustrations of a motorized transport unit of the system of FIG. 1 in a retracted orientation and an extended orientation in accordance with some embodiments.
Figure 2B:
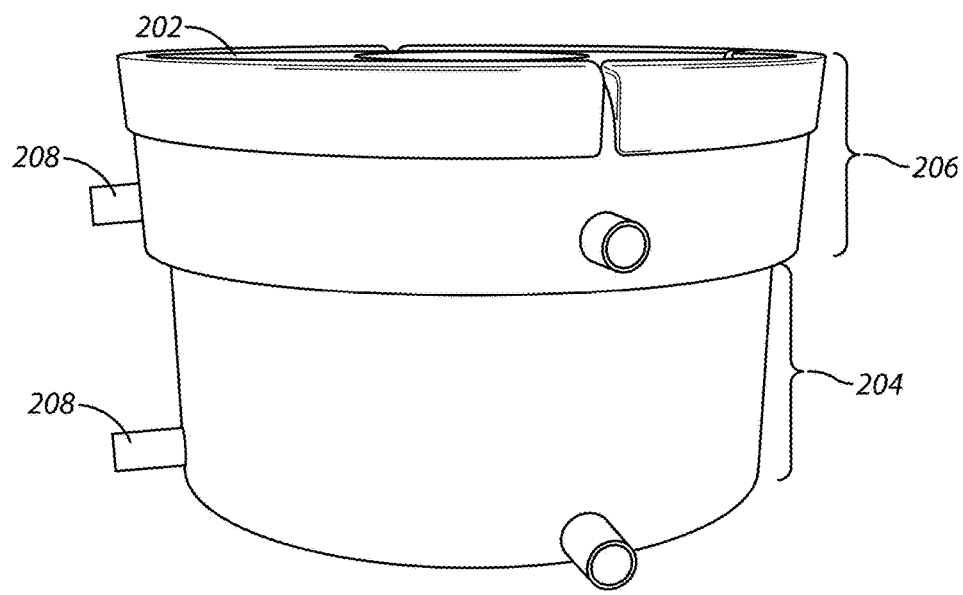

FIGS. 2A and 2B illustrate some embodiments of a motorized transport unit 202, similar to the motorized transport unit 102 shown in the system of FIG. 1. In this embodiment, the motorized transport unit 202 takes the form of a disc-shaped robotic device having motorized wheels (not shown), a lower body portion 204 and an upper body portion 206 that fits over at least part of the lower body portion 204. It is noted that in other embodiments, the motorized transport unit may have other shapes and/or configurations, and is not limited to disc-shaped. For example, the motorized transport unit may be cubic, octagonal, triangular, or other shapes, and may be dependent on a movable item container with which the motorized transport unit is intended to cooperate. Also included are guide members 208. In FIG. 2A, the motorized transport unit 202 is shown in a retracted position in which the upper body portion 206 fits over the lower body portion 204 such that the motorized transport unit 202 is in its lowest profile orientation which is generally the preferred orientation for movement when it is unattached to a movable item container 104 for example. In FIG. 2B, the motorized transport unit 202 is shown in an extended position in which the upper body portion 206 is moved upward relative to the lower body portion 204 such that the motorized transport unit 202 is in its highest profile orientation for movement when it is lifting and attaching to a movable item container 104 for example. The mechanism within the motorized transport unit 202 is designed to provide sufficient lifting force to lift the weight of the upper body portion 206 and other objects to be lifted by the motorized transport unit 202, such as movable item containers 104 and items placed within the movable item container, item display modules 130 and items supported by the item display module, and storage lockers 132 and items placed within the storage locker. The guide members 208 are embodied as pegs or shafts that extend horizontally from the both the upper body portion 206 and the lower body portion 204. In some embodiments, these guide members 208 assist docking the motorized transport unit 202 to a docking station 122 or a dispenser 120. In some embodiments, the lower body portion 204 and the upper body portion are capable to moving independently of each other. For example, the upper body portion 206 may be raised and/or rotated relative to the lower body portion 204. That is, one or both of the upper body portion 206 and the lower body portion 204 may move toward/away from the other or rotated relative to the other. In some embodiments, in order to raise the upper body portion 206 relative to the lower body portion 204, the motorized transport unit 202 includes an internal lifting system (e.g., including one or more electric actuators or rotary drives or motors). Numerous examples of such motorized lifting and rotating systems are known in the art. Accordingly, further elaboration in these regards is not provided here for the sake of brevity.

Figure 3B:
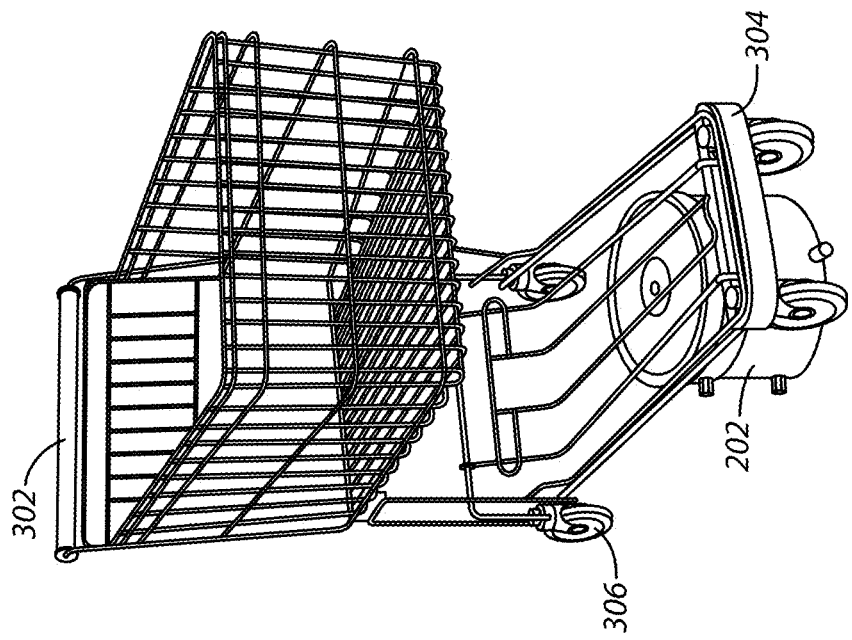
FIGS. 3A and 3B are illustrations of the motorized transport unit of FIGS. 2A and 2B detachably coupling to a movable item container, such as a shopping cart, in accordance with some embodiments.
Figure 3A:
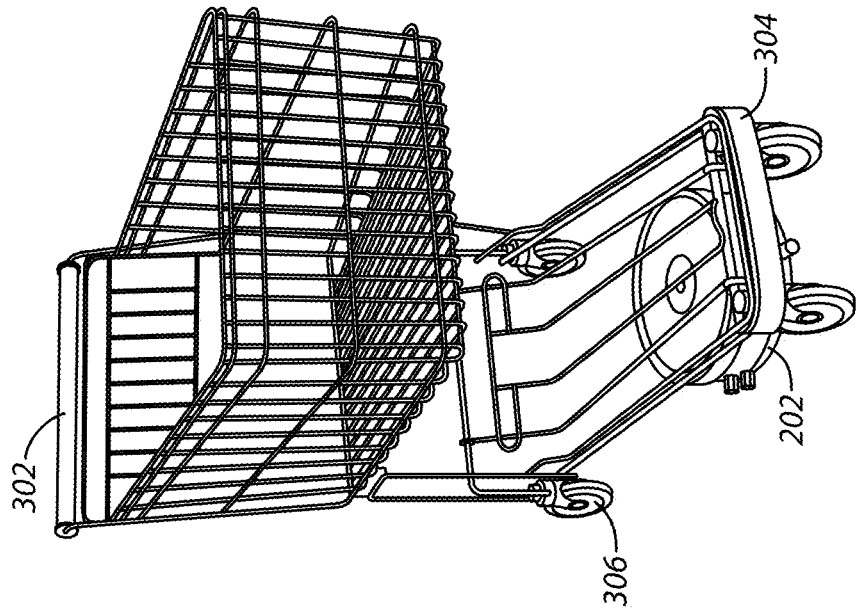

FIGS. 3A and 3B illustrate some embodiments of the motorized transport unit 202 detachably engaging a movable item container embodied as a shopping cart 302. In FIG. 3A, the motorized transport unit 202 is in the orientation of FIG. 2A such that it is retracted and able to move in position underneath a portion of the shopping cart 302. Once the motorized transport unit 202 is in position (e.g., using sensors), as illustrated in FIG. 3B, the motorized transport unit 202 is moved to the extended position of FIG. 2B such that the front portion 304 of the shopping cart is lifted off of the ground by the motorized transport unit 202, with the wheels 306 at the rear of the shopping cart 302 remaining on the ground. In this orientation, the motorized transport unit 202 is able to move the shopping cart 302 throughout the shopping facility. It is noted that in these embodiments, the motorized transport unit 202 does not bear the weight of the entire cart 302 since the rear wheels 306 rest on the floor. It is understood that in some embodiments, the motorized transport unit 202 may be configured to detachably engage other types of movable item containers, such as rocket carts, flatbed carts or other mobile baskets or platforms.

Figure 4:
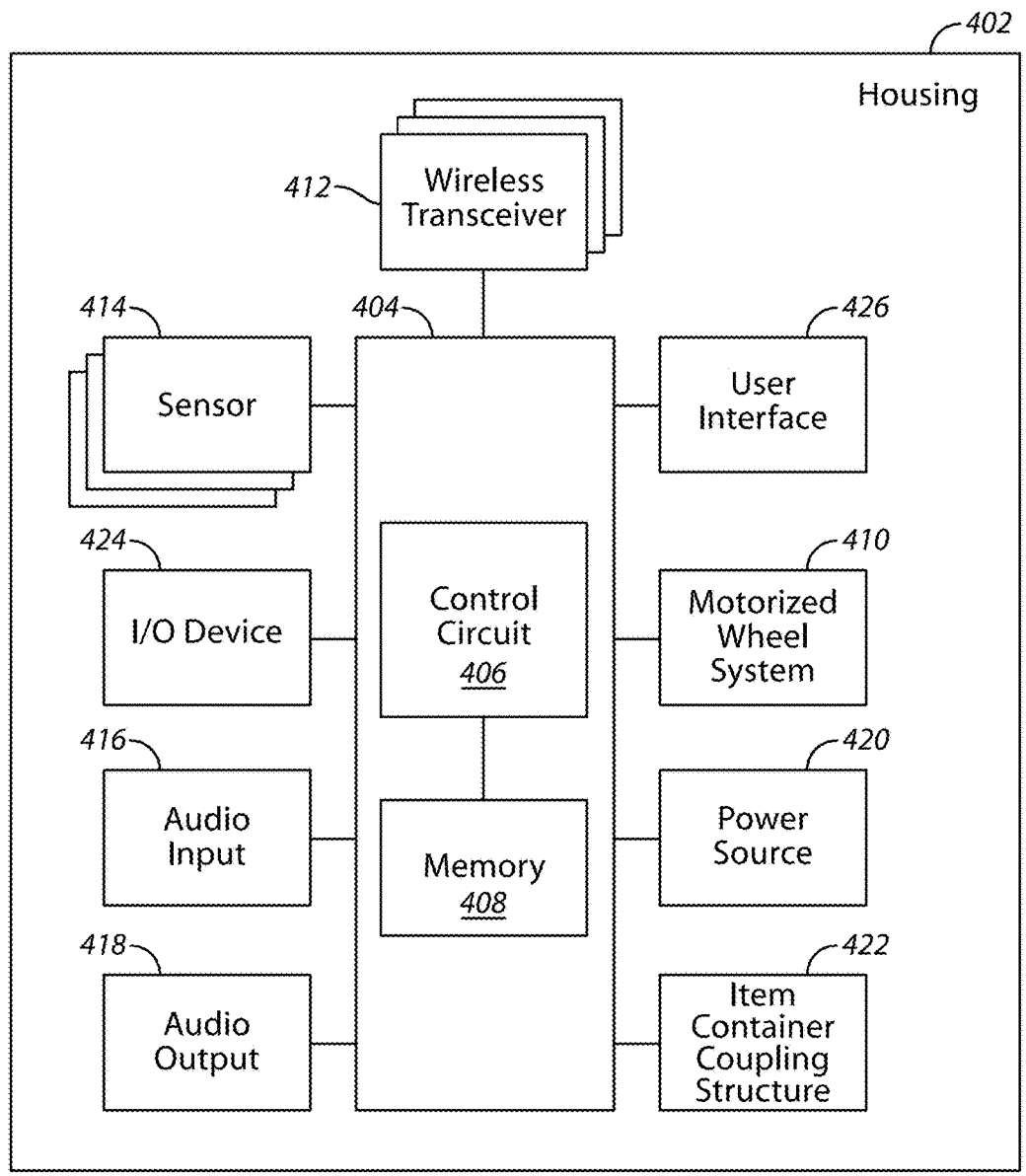
FIG. 4 comprises a block diagram of a motorized transport unit as configured in accordance with various embodiments of these teachings.

FIG. 4 presents a more detailed example of some embodiments of the motorized transport unit 102 of FIG. 1. In this example, the motorized transport unit 102 has a housing 402 that contains (partially or fully) or at least supports and carries a number of components. These components include a control unit 404 comprising a control circuit 406 that, like the control circuit 108 of the central computer system 106, controls the general operations of the motorized transport unit 102. Accordingly, the control unit 404 also includes a memory 408 coupled to the control circuit 406 and that stores, for example, operating instructions and/or useful data.

The control circuit 406 operably couples to a motorized wheel system 410. This motorized wheel system 410 functions as a locomotion system to permit the motorized transport unit 102 to move within the aforementioned retail or shopping facility 101 (thus, the motorized wheel system 410 may more generically be referred to as a locomotion system). Generally speaking, this motorized wheel system 410 will include at least one drive wheel (i.e., a wheel that rotates (around a horizontal axis) under power to thereby cause the motorized transport unit 102 to move through interaction with, for example, the floor of the shopping facility 101). The motorized wheel system 410 can include any number of rotating wheels and/or other floor-contacting mechanisms as may be desired and/or appropriate to the application setting.

The motorized wheel system 410 also includes a steering mechanism of choice. One simple example in these regards comprises one or more of the aforementioned wheels that can swivel about a vertical axis to thereby cause the moving motorized transport unit 102 to turn as well.

Numerous examples of motorized wheel systems are known in the art. Accordingly, further elaboration in these regards is not provided here for the sake of brevity save to note that the aforementioned control circuit 406 is configured to control the various operating states of the motorized wheel system 410 to thereby control when and how the motorized wheel system 410 operates.

In this illustrative example, the control circuit 406 also operably couples to at least one wireless transceiver 412 that operates according to any known wireless protocol. This wireless transceiver 412 can comprise, for example, a Wi-Fi-compatible and/or Bluetooth-compatible transceiver that can communicate with the aforementioned central computer system 106 via the aforementioned wireless network 124 of the shopping facility 101. So configured the control circuit 406 of the motorized transport unit 102 can provide information to the central computer system 106 and can receive information and/or instructions from the central computer system 106. As one simple example in these regards, the control circuit 406 can receive instructions from the central computer system 106 regarding movement of the motorized transport unit 102.

These teachings will accommodate using any of a wide variety of wireless technologies as desired and/or as may be appropriate in a given application setting. These teachings will also accommodate employing two or more different wireless transceivers 412 if desired.

The control circuit 406 also couples to one or more on-board sensors 414. These teachings will accommodate a wide variety of sensor technologies and form factors. By one approach at least one such sensor 414 can comprise a light sensor or light receiver. When the aforementioned location detection system 116 comprises a plurality of light emitters disposed at particular locations within the shopping facility 101, such a light sensor can provide information that the control circuit 406 and/or the central computer system 106 employs to determine a present location and/or orientation of the motorized transport unit 102.

As another example, such a sensor 414 can comprise a distance measurement unit configured to detect a distance between the motorized transport unit 102 and one or more objects or surfaces around the motorized transport unit 102 (such as an object that lies in a projected path of movement for the motorized transport unit 102 through the shopping facility 101). These teachings will accommodate any of a variety of distance measurement units including optical units and sound/ultrasound units. In one example, a sensor 414 comprises a laser distance sensor device capable of determining a distance to objects in proximity to the sensor. In some embodiments, a sensor 414 comprises an optical based scanning device to sense and read optical patterns in proximity to the sensor, such as bar codes variously located on structures in the shopping facility 101. In some embodiments, a sensor 414 comprises a radio frequency identification (RFID) tag reader capable of reading RFID tags in proximity to the sensor. Such sensors may be useful to determine proximity to nearby objects, avoid collisions, orient the motorized transport unit at a proper alignment orientation to engage a movable item container, and so on.

The foregoing examples are intended to be illustrative and are not intended to convey an exhaustive listing of all possible sensors. Instead, it will be understood that these teachings will accommodate sensing any of a wide variety of circumstances or phenomena to support the operating functionality of the motorized transport unit 102 in a given application setting.

By one optional approach an audio input 416 (such as a microphone) and/or an audio output 418 (such as a speaker) can also operably couple to the control circuit 406. So configured the control circuit 406 can provide a variety of audible sounds to thereby communicate with a user of the motorized transport unit 102, other persons in the vicinity of the motorized transport unit 102, or even other motorized transport units 102 in the area. These audible sounds can include any of a variety of tones and other non-verbal sounds. These audible sounds can also include, in lieu of the foregoing or in combination therewith, pre-recorded or synthesized speech.

The audio input 416, in turn, provides a mechanism whereby, for example, a user provides verbal input to the control circuit 406. That verbal input can comprise, for example, instructions, inquiries, or information. So configured, a user can provide, for example, a question to the motorized transport unit 102 (such as, "Where are the towels?"). The control circuit 406 can cause that verbalized question to be transmitted to the central computer system 106 via the motorized transport unit's wireless transceiver 412. The central computer system 106 can process that verbal input to recognize the speech content and to then determine an appropriate response. That response might comprise, for example, transmitting back to the motorized transport unit 102 specific instructions regarding how to move the motorized transport unit 102 (via the aforementioned motorized wheel system 410) to the location in the shopping facility 101 where the towels are displayed.

In this example the motorized transport unit 102 includes a rechargeable power source 420 such as one or more batteries. The power provided by the rechargeable power source 420 can be made available to whichever components of the motorized transport unit 102 require electrical energy. By one approach the motorized transport unit 102 includes a plug or other electrically conductive interface that the control circuit 406 can utilize to automatically connect to an external source of electrical energy to thereby recharge the rechargeable power source 420.

By one approach the motorized transport unit 102 comprises an integral part of a movable item container 104 such as a grocery cart. As used herein, this reference to "integral" will be understood to refer to a non-temporary combination and joinder that is sufficiently complete so as to consider the combined elements to be as one. Such a joinder can be facilitated in a number of ways including by securing the motorized transport unit housing 402 to the item container using bolts or other threaded fasteners as versus, for example, a clip.

These teachings will also accommodate selectively and temporarily attaching the motorized transport unit 102 to an item container 104. In such a case the motorized transport unit 102 can include a movable item container coupling structure 422. By one approach this movable item container coupling structure 422 operably couples to a control circuit 202 to thereby permit the latter to control, for example, the latched and unlatched states of the movable item container coupling structure 422. So configured, by one approach the control circuit 406 can automatically and selectively move the motorized transport unit 102 (via the motorized wheel system 410) towards a particular item container until the movable item container coupling structure 422 can engage the item container to thereby temporarily physically couple the motorized transport unit 102 to the item container. So latched, the motorized transport unit 102 can then cause the item container to move with the motorized transport unit 102. In embodiments such as illustrated in FIGS. 2A-3B, the movable item container coupling structure 422 includes a lifting system (e.g., including an electric drive or motor) to cause a portion of the body or housing 402 to engage and lift a portion of the item container off of the ground such that the motorized transport unit 102 can carry a portion of the item container. In other embodiments, the movable transport unit latches to a portion of the movable item container without lifting a portion thereof off of the ground.

In either case, by combining the motorized transport unit 102 with an item container, and by controlling movement of the motorized transport unit 102 via the aforementioned central computer system 106, these teachings will facilitate a wide variety of useful ways to assist both customers and associates in a shopping facility setting. For example, the motorized transport unit 102 can be configured to follow a particular customer as they shop within the shopping facility 101. The customer can then place items they intend to purchase into the item container that is associated with the motorized transport unit 102.

In some embodiments, the motorized transport unit 102 includes an input/output (I/O) device 424 that is coupled to the control circuit 406. The I/O device 424 allows an external device to couple to the control unit 404. The function and purpose of connecting devices will depend on the application. In some examples, devices connecting to the I/O device 424 may add functionality to the control unit 404, allow the exporting of data from the control unit 404, allow the diagnosing of the motorized transport unit 102, and so on.

In some embodiments, the motorized transport unit 102 includes a user interface 426 including for example, user inputs and/or user outputs or displays depending on the intended interaction with the user. For example, user inputs could include any input device such as buttons, knobs, switches, touch sensitive surfaces or display screens, and so on. Example user outputs include lights, display screens, and so on. The user interface 426 may work together with or separate from any user interface implemented at a user interface unit 114 (such as a smart phone or tablet device).

The control unit 404 includes a memory 408 coupled to the control circuit 406 and that stores, for example, operating instructions and/or useful data. The control circuit 406 can comprise a fixed-purpose hard-wired platform or can comprise a partially or wholly programmable platform. These architectural options are well known and understood in the art and require no further description here. This control circuit 406 is configured (for example, by using corresponding programming stored in the memory 408 as will be well understood by those skilled in the art) to carry out one or more of the steps, actions, and/or functions described herein. The memory 408 may be integral to the control circuit 406 or can be physically discrete (in whole or in part) from the control circuit 406 as desired. This memory 408 can also be local with respect to the control circuit 406 (where, for example, both share a common circuit board, chassis, power supply, and/or housing) or can be partially or wholly remote with respect to the control circuit 406. This memory 408 can serve, for example, to non-transitorily store the computer instructions that, when executed by the control circuit 406, cause the control circuit 406 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

It is noted that not all components illustrated in FIG. 4 are included in all embodiments of the motorized transport unit 102. That is, some components may be optional depending on the implementation.

Figure 5:
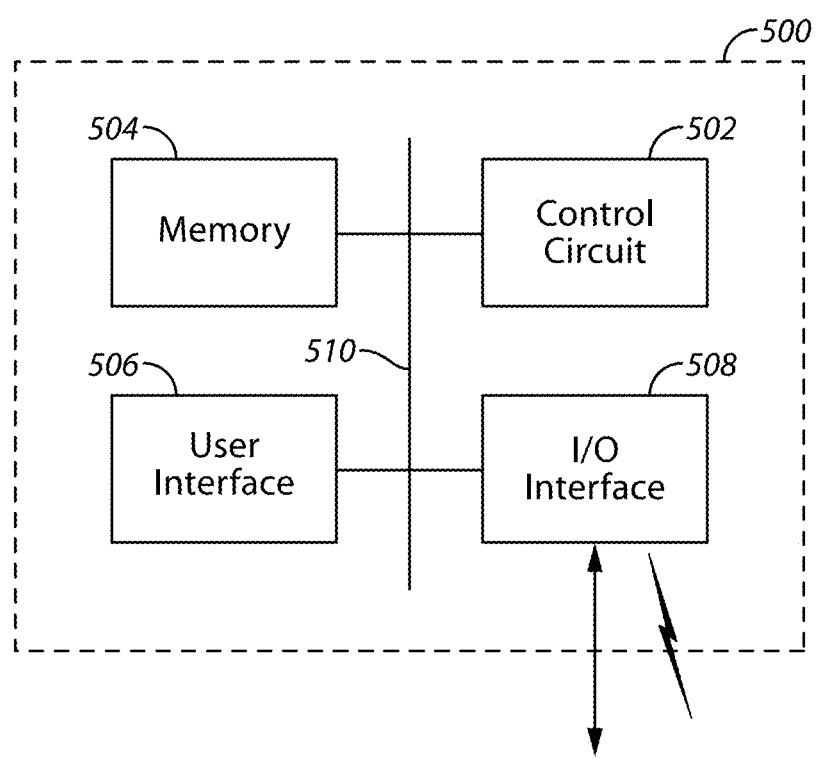
FIG. 5 comprises a block diagram of a computer device as configured in accordance with various embodiments of these teachings.

FIG. 5 illustrates a functional block diagram that may generally represent any number of various electronic components of the system 100 that are computer type devices. The computer device 500 includes a control circuit 502, a memory 504, a user interface 506 and an input/output (I/O) interface 508 providing any type of wired and/or wireless connectivity to the computer device 500, all coupled to a communication bus 510 to allow data and signaling to pass therebetween. Generally, the control circuit 502 and the memory 504 may be referred to as a control unit. The control circuit 502, the memory 504, the user interface 506 and the I/O interface 508 may be any of the devices described herein or as understood in the art. The functionality of the computer device 500 will depend on the programming stored in the memory 504. The computer device 500 may represent a high level diagram for one or more of the central computer system 106, the motorized transport unit 102, the user interface unit 114, the location detection system 116, the user interface computer 128, the MTU docking station 122 and the MTU dispenser 120, or any other device or component in the system that is implemented as a computer device.

Additional Features Overview

Referring generally to FIGS. 1-5, the shopping assistance system 100 may implement one or more of several different features depending on the configuration of the system and its components. The following provides a brief description of several additional features that could be implemented by the system. One or more of these features could also be implemented in other systems separate from embodiments of the system. This is not meant to be an exhaustive description of all features and not meant to be an exhaustive description of the details any one of the features. Further details with regards to one or more features beyond this overview may be provided herein.

Tagalong Steering: This feature allows a given motorized transport unit 102 to lead or follow a user (e.g., a customer and/or a worker) throughout the shopping facility 101. For example, the central computer system 106 uses the location detection system 116 to determine the location of the motorized transport unit 102. For example, LED smart lights (e.g., the ByteLight system) of the location detection system 116 transmit a location number to smart devices which are with the customer (e.g., user interface units 114), and/or on the item container 104/motorized transport unit 102. The central computer system 106 receives the LED location numbers received by the smart devices through the wireless network 124. Using this information, in some embodiments, the central computer system 106 uses a grid placed upon a 2D CAD map and 3D point cloud model (e.g., from the databases 126) to direct, track, and plot paths for the other devices. Using the grid, the motorized transport unit 102 can drive a movable item container 104 in a straight path rather than zigzagging around the facility. As the user moves from one grid to another, the motorized transport unit 102 drives the container 104 from one grid to the other. In some embodiments, as the user moves towards the motorized transport unit, it stays still until the customer moves beyond an adjoining grid.

Detecting Objects: In some embodiments, motorized transport units 102 detect objects through several sensors mounted on motorized transport unit 102, through independent cameras (e.g., video cameras 118), through sensors of a corresponding movable item container 104, and through communications with the central computer system 106. In some embodiments, with semi-autonomous capabilities, the motorized transport unit 102 will attempt to avoid obstacles, and if unable to avoid, it will notify the central computer system 106 of an exception condition. In some embodiments, using sensors 414 (such as distance measurement units, e.g., laser or other optical-based distance measurement sensors), the motorized transport unit 102 detects obstacles in its path, and will move to avoid, or stop until the obstacle is clear.

Visual Remote Steering: This feature enables movement and/or operation of a motorized transport unit 102 to be controlled by a user on-site, off-site, or anywhere in the world. This is due to the architecture of some embodiments where the central computer system 106 outputs the control signals to the motorized transport unit 102. These controls signals could have originated at any device in communication with the central computer system 106. For example, the movement signals sent to the motorized transport unit 102 may be movement instructions determined by the central computer system 106; commands received at a user interface unit 114 from a user; and commands received at the central computer system 106 from a remote user not located at the shopping facility space.

Determining Location: Similar to that described above, this feature enables the central computer system 106 to determine the location of devices in the shopping facility 101. For example, the central computer system 106 maps received LED light transmissions, Bluetooth low energy radio signals or audio signals (or other received signals encoded with location data) to a 2D map of the shopping facility. Objects within the area of the shopping facility are also mapped and associated with those transmissions. Using this information, the central computer system 106 can determine the location of devices such as motorized transport units.

Digital Physical Map Integration: In some embodiments, the system 100 is capable of integrating 2D and 3D maps of the shopping facility with physical locations of objects and workers. Once the central computer system 106 maps all objects to specific locations using algorithms, measurements and LED geo-location, for example, grids are applied which sections off the maps into access ways and blocked sections. Motorized transport units 102 use these grids for navigation and recognition. In some cases, grids are applied to 2D horizontal maps along with 3D models. In some cases, grids start at a higher unit level and then can be broken down into smaller units of measure by the central computer system 106 when needed to provide more accuracy.

Calling a Motorized Transport Unit: This feature provides multiple methods to request and schedule a motorized transport unit 102 for assistance in the shopping facility. In some embodiments, users can request use of a motorized transport unit 102 through the user interface unit 114. The central computer system 106 can check to see if there is an available motorized transport unit. Once assigned to a given user, other users will not be able to control the already assigned transport unit. Workers, such as store associates, may also reserve multiple motorized transport units in order to accomplish a coordinated large job.

Locker Delivery: In some embodiments, one or more motorized transport units 102 may be used to pick, pack, and deliver items to a particular storage locker 132. The motorized transport units 102 can couple to and move the storage locker to a desired location. In some embodiments, once delivered, the requestor will be notified that the items are ready to be picked up, and will be provided the locker location and locker security code key.

Route Optimization: In some embodiments, the central computer system automatically generates a travel route for one or more motorized transport units through the shopping facility space. In some embodiments, this route is based on one or more of a user provided list of items entered by the user via a user interface unit 114; user selected route preferences entered by the user via the user interface unit 114; user profile data received from a user information database (e.g., from one of databases 126); and product availability information from a retail inventory database (e.g., from one of databases 126). In some cases, the route intends to minimize the time it takes to get through the facility, and in some cases, may route the shopper to the least busy checkout area. Frequently, there will be multiple possible optimum routes. The route chosen may take the user by things the user is more likely to purchase (in case they forgot something), and away from things they are not likely to buy (to avoid embarrassment). That is, routing a customer through sporting goods, women's lingerie, baby food, or feminine products, who has never purchased such products based on past customer behavior would be non-productive, and potentially embarrassing to the customer. In some cases, a route may be determined from multiple possible routes based on past shopping behavior, e.g., if the customer typically buys a cold Diet Coke product, children's shoes or power tools, this information would be used to add weight to the best alternative routes, and determine the route accordingly.

Store Facing Features: In some embodiments, these features enable functions to support workers in performing store functions. For example, the system can assist workers to know what products and items are on the shelves and which ones need attention. For example, using 3D scanning and point cloud measurements, the central computer system can determine where products are supposed to be, enabling workers to be alerted to facing or zoning of issues along with potential inventory issues.

Phone Home: This feature allows users in a shopping facility 101 to be able to contact remote users who are not at the shopping facility 101 and include them in the shopping experience. For example, the user interface unit 114 may allow the user to place a voice call, a video call, or send a text message. With video call capabilities, a remote person can virtually accompany an in-store shopper, visually sharing the shopping experience while seeing and talking with the shopper. One or more remote shoppers may join the experience.

Returns: In some embodiments, the central computer system 106 can task a motorized transport unit 102 to keep the returns area clear of returned merchandise. For example, the transport unit may be instructed to move a cart from the returns area to a different department or area. Such commands may be initiated from video analytics (the central computer system analyzing camera footage showing a cart full), from an associate command (digital or verbal), or on a schedule, as other priority tasks allow. The motorized transport unit 102 can first bring an empty cart to the returns area, prior to removing a full one.

Bring a Container: One or more motorized transport units can retrieve a movable item container 104 (such as a shopping cart) to use. For example, upon a customer or worker request, the motorized transport unit 102 can reposition one or more item containers 104 from one location to another. In some cases, the system instructs the motorized transport unit where to obtain an empty item container for use. For example, the system can recognize an empty and idle item container that has been abandoned or instruct that one be retrieved from a cart storage area. In some cases, the call to retrieve an item container may be initiated through a call button placed throughout the facility, or through the interface of a user interface unit 114.

Respond to Voice Commands: In some cases, control of a given motorized transport unit is implemented through the acceptance of voice commands. For example, the user may speak voice commands to the motorized transport unit 102 itself and/or to the user interface unit 114. In some embodiments, a voice print is used to authorize to use of a motorized transport unit 102 to allow voice commands from single user at a time.

Retrieve Abandoned Item Containers: This feature allows the central computer system to track movement of movable item containers in and around the area of the shopping facility 101, including both the sale floor areas and the back-room areas. For example, using visual recognition through store cameras 118 or through user interface units 114, the central computer system 106 can identify abandoned and out-of-place movable item containers. In some cases, each movable item container has a transmitter or smart device which will send a unique identifier to facilitate tracking or other tasks and its position using LED geo-location identification. Using LED geo-location identification with the Determining Location feature through smart devices on each cart, the central computer system 106 can determine the length of time a movable item container 104 is stationary.

Stocker Assistance: This feature allows the central computer system to track movement of merchandise flow into and around the back-room areas. For example, using visual recognition and captured images, the central computer system 106 can determine if carts are loaded or not for moving merchandise between the back room areas and the sale floor areas. Tasks or alerts may be sent to workers to assign tasks.

Self-Docking: Motorized transport units 102 will run low or out of power when used. Before this happens, the motorized transport units 102 need to recharge to stay in service. According to this feature, motorized transport units 102 will self-dock and recharge (e.g., at a MTU docking station 122) to stay at maximum efficiency, when not in use. When use is completed, the motorized transport unit 102 will return to a docking station 122. In some cases, if the power is running low during use, a replacement motorized transport unit can be assigned to move into position and replace the motorized transport unit with low power. The transition from one unit to the next can be seamless to the user.

Item Container Retrieval: With this feature, the central computer system 106 can cause multiple motorized transport units 102 to retrieve abandoned item containers from exterior areas such as parking lots. For example, multiple motorized transport units are loaded into a movable dispenser, e.g., the motorized transport units are vertically stacked in the dispenser. The dispenser is moved to the exterior area and the transport units are dispensed. Based on video analytics, it is determined which item containers 104 are abandoned and for how long. A transport unit will attach to an abandoned cart and return it to a storage bay.

Motorized Transport Unit Dispenser: This feature provides the movable dispenser that contains and moves a group of motorized transport units to a given area (e.g., an exterior area such as a parking lot) to be dispensed for use. For example, motorized transport units can be moved to the parking lot to retrieve abandoned item containers 104. In some cases, the interior of the dispenser includes helically wound guide rails that mate with the guide member 208 to allow the motorized transport units to be guided to a position to be dispensed.

Specialized Module Retrieval: This feature allows the system 100 to track movement of merchandise flow into and around the sales floor areas and the back-room areas including special modules that may be needed to move to the sales floor. For example, using video analytics, the system can determine if a modular unit it loaded or empty. Such modular units may house items that are of seasonal or temporary use on the sales floor. For example, when it is raining, it is useful to move a module unit displaying umbrellas from a back room area (or a lesser accessed area of the sales floor) to a desired area of the sales floor area.

Authentication: This feature uses a voice imprint with an attention code/word to authenticate a user to a given motorized transport unit. One motorized transport unit can be swapped for another using this authentication. For example, a token is used during the session with the user. The token is a unique identifier for the session which is dropped once the session is ended. A logical token may be a session id used by the application of the user interface unit 114 to establish the session id when user logs on and when deciding to do use the system 100. In some embodiments, communications throughout the session are encrypted using SSL or other methods at transport level.

Further Details of Some Embodiments

In accordance with some embodiments, further details are now provided for one or more of these and other features. For example, generally speaking, pursuant to various embodiments, systems, apparatuses, processes and methods are provided herein that provide motorized transport units at a shopping facility that aid customers in their shopping experience. Further, the motorized transport units may, in some embodiments, help shopping facility associates, shopping facility colleague, etc. in performing multiple different tasks, such as moving products from a storage area to the customer accessible shopping floor, identifying products that need to be addressed, moving movable item containers, and numerous other tasks. Each of the motorized transport units typically include one or more batteries, capacitors, and/or other such electrical power storage units that provide electrical power to the motorized transport unit to allow the transport unit to move through the shopping facility. The batteries, capacitors or the like are typically rechargeable to allow the motorized transport units to be repeatedly used.

Referring back to FIG. 1, in some embodiments shopping facility assistance system 100 includes one or more docking stations 122 and/or dispensers 120 (where a docking station and/or a dispenser may be referred to generally as a recharge station). The central computer system 106, in part, is configured to monitor motorized transport unit status information, location information, recharge station status information, recharge station location information, mappings, and when and whether motorized transport units are to be recharged. In some embodiments, a motorized transport unit can be directed to an available recharge station in response to a determination that the stored power levels are below a threshold. Similarly, the central computer system may direct a first motorized transport unit to decouple or detach from a movable item container so that it can cooperate with a recharge station, while further directing a second motorized transport unit to take the place of the first motorized transport unit and couple with the movable item container to allow a customer to continue a shopping experience without interruption due to a low power and/or failing motorized transport unit.

The shopping assistance system 100 may be utilized with a single shopping facility (e.g., such as a store location, shopping mall, retail campus or the like), while in other implementations, the shopping assistance system may extend across multiple shopping facility locations. For simplicity, the embodiments herein are described with respect to a single shopping facility. It will be appreciated by those skilled in the art that some embodiments can be applicable to multiple shopping facilities and/or the management of cooperative shopping experiences at one or more shopping facilities. Further, the shopping assistance system may be operated local at a shopping facility location or remote from the shopping facility location.

As described above and further below, the motorized transport units 102 are self-propelled and configured to move themselves throughout at least some, if not all of the shopping facility. Typically, the motorized transport units 102 wirelessly receive commands, instructions, route information and/or mapping information from the central computer system, which may include a location controller and/or route controller that can direct the motorized transport units to desired locations and/or along desired routes within or outside of the shopping facility. Further, in some embodiments, the motorized transport units 102 are configured to be fixed with or removably coupled with the movable item containers 104 to move the movable item containers throughout authorized areas of the shopping facility, and in some instances outside of the shopping facility. The movable item containers 104 are configured to be used by customers and/or shopping facility associates or other employees in transporting products through the shopping facility. For example, in some embodiments, the movable item containers can be baskets, bins, wheeled carts, wheeled pallets, advertising systems, and/or other such movable item containers. For simplicity, the embodiments below are described with respect to carts or shopping carts. It will be appreciated by those skilled in the art, however, that the movable item containers are not limited to carts, but can be other objects configured to carry products.

In some embodiments, the motorized transport units 102 and/or the movable item containers 104 provide information to the central computer system 106 to at least allow the central computer system to facilitate the association of the customers. Typically, the motorized transport units 102 are configured with one or more detection systems (e.g., sensors, detectors, measurement systems, etc.) that can provide relevant information to the central computer system (e.g., location information, movement information, product information, video content, and other such information).

Figure 6:
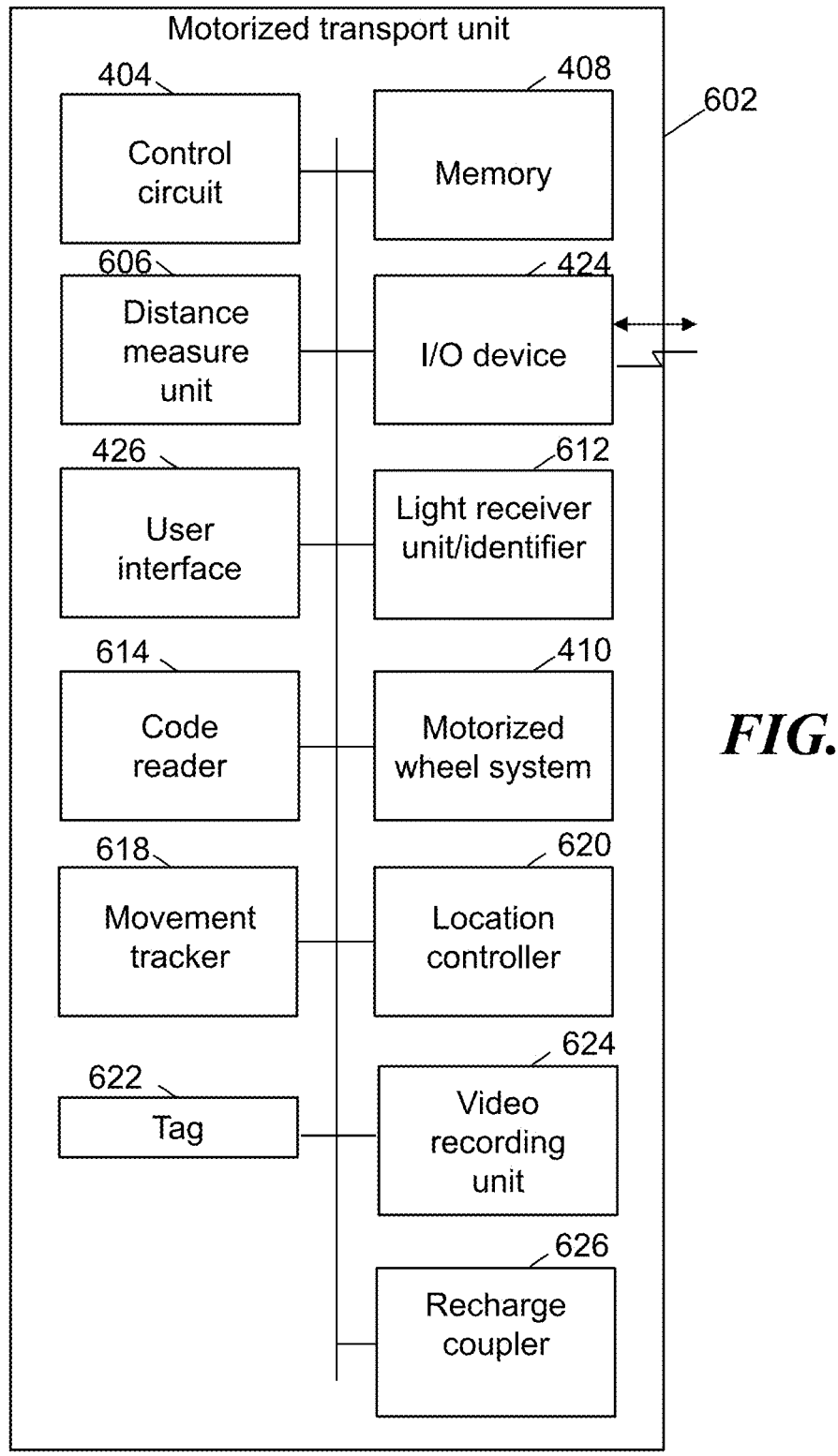
FIG. 6 shows a simplified block diagram of an exemplary motorized transport unit, in accordance with some embodiments.

FIG. 6 shows a simplified block diagram of an exemplary motorized transport unit 602, in accordance with some embodiments. The motorized transport unit includes one or more control circuit 404, memory 408, input/output (I/O) interfaces or devices 424 and motorized wheel systems 410. Some embodiments further include a user interface 426. Still further, the motorized transport unit may also include one or more sensors and/or measurement units, such as but not limited to one or more distance measurement units 606, light receiver units 612, optical and/or machine readable code readers 614, movement tracker units 618, location controller 620, camera and/or video recording unit 624, audio sensors and/or recorders, and/or other such sensors and measurement units, and typically a combination of two or more of such sensors. In some embodiments, the motorized transport unit 602 may include one or more tags 622 or other device that may be detectable, such as by location tracking units located at one or more positions throughout the shopping facility, by one or more movable item containers 104, or by other systems of the shopping assistance system 100. In some embodiments, the tag 622 is an RFID tag or other tag, and can in some instances provide a unique identifier of the motorized transport unit. A recharge coupler 626 is typically also included with the motorized transport unit. The recharge coupler is configured to allow the motorized transport unit to temporarily electrically couple with a recharge station to recharge one or more power storage devices of the motorized transport unit (e.g., battery, capacitor, etc.).

The control circuit 404 typically comprises one or more processors and/or microprocessors. The memory 408 stores the operational code or set of instructions that is executed by the control circuit 404 and/or processor to implement the functionality of the motorized transport unit 602. In some embodiments, the memory 408 may also store some or all of particular data that may be needed to make any of the associations, determinations, measurements and/or communications described herein. Such data may be pre-stored in the memory, received from an external source (e.g., the central computer system 106), be determined, and/or communicated to the motorized transport unit, such as from the movable item container 104, a user interface unit 114, other source or combination of such sources. It is understood that the control circuit 404 and/or processor may be implemented as one or more processor devices as are well known in the art. Similarly, the memory 408 may be implemented as one or more memory devices as are well known in the art, such as one or more processor readable and/or computer readable media and can include volatile and/or nonvolatile media, such as RAM, ROM, EEPROM, flash memory and/or other memory technology. Further, the memory 408 is shown as internal to the motorized transport unit 602; however, the memory 408 can be internal, external or a combination of internal and external memory. Additionally, the motorized transport unit typically includes a power supply (not shown). While FIG. 6 illustrates the various components being coupled together via a bus, it is understood that the various components may actually be coupled to the control circuit 404 and/or one or more other components directly.

Generally, the control circuit 404 and/or electronic components of the motorized transport unit 602 can comprise fixed-purpose hard-wired platforms or can comprise a partially or wholly programmable platform. These architectural options are well known and understood in the art and require no further description here. The motorized transport unit and/or control circuit can be configured (for example, by using corresponding programming as will be well understood by those skilled in the art) to carry out one or more of the steps, actions, and/or functions described herein.

The control circuit 404 and the memory 408 may be integrated together, such as in a microcontroller, application specification integrated circuit, field programmable gate array or other such device, or may be separate devices coupled together. The I/O device 424 allows wired and/or wireless communication coupling of the motorized transport unit to external components, such as the central computer system 106, the user interface units 114, the movable item containers 104, and other such components. Typically, the I/O device 424 provides at least wireless communication (e.g., Wi-Fi, Bluetooth, cellular, RF, and/or other such wireless communication), and in some instances may include any known wired and/or wireless interfacing device, circuit and/or connecting device.

The user interface 426 may be used for user input and/or output (e.g., audio and/or visual, display, etc.). For example, the user interface 426 may include any known input devices, such one or more buttons, knobs, selectors, switches, keys, touch input surfaces, audio input unit, and/or displays, etc. Additionally, the user interface may include one or more output display devices, such as lights, visual indicators, display screens, etc. to convey information to a user, such as local customer information, remote customer information (e.g., identification, contact information, etc.), shopping or product list information (e.g., local and/or remote customer shopping lists), product information, video content (e.g., video from the remote customer, product video information, etc.), other communication information (e.g., text messages, emails, etc.), status information, location information, mapping information, product location information, operating status information, notifications, errors, conditions, advertising, product recommendations, and/or other such information. Similarly, the user interface in some embodiments may include audio units and/or systems that can receive audio commands or requests verbally issued by a customer, and/or output audio content (e.g., audio from the remote customer, information about a product, information about a route through the shopping facility, advertising, and other such audio content).

The motorized transport unit 602 further includes the motorized wheel system 410 or locomotion system that includes and controls one or more motors of the motorized transport unit to at least cause the motorized transport unit to move throughout one or more areas within and/or exterior to the shopping facility. Typically, the motorized wheel system controls the one or more motors in accordance with one or more commands, position information, mapping coordinates, destination locations and the like. In some embodiments, the central computer system 106 and/or a location controller is configured to issue movement commands based on a determined and/or predicted location of the motorized transport unit. The motorized wheel system 410 can control the one or more motors to implement the one or more movement commands. In some embodiments, the motorized transport unit further includes the movement tracker unit 618 that is configured to track one or more parameters corresponding to the movement and/or orientation of the motorized transport unit. For example, the movement tracker unit may include and/or communicate with one or more accelerometers, gyroscopes, compasses, wheel or tread velocity or rate meters, odometer based on wheel and/or tread movement, compass sensor, global positioning satellite (GPS) information, Wi-Fi signal evaluation, and/or other such movement detectors. These parameters can be used in determining, predicting, and/or fine tuning a location of the motorized transport unit.

In some embodiments, the motorized transport unit 602 includes one or more distance measurement units 606 configured to measure relative distances between the motorized transport unit and one or more external objects. For example, the distance measurement unit can be used to measure relative distances between the motorized transport unit and a shelf or rack within the shopping facility, another motorized transport unit, a wall, a structural support column, movable item containers, the customer associated with the motorized transport unit, other customers not associated with the motorized transport unit, and/or substantially any other external object. In some implementations the motorized transport unit includes a laser distance measurement unit that uses one or more lasers to measure distances between the motorized transport unit and an external object. Further, in some embodiments, the motorized transport unit includes multiple distance measurement units positioned to measure distances around the motorized transport unit. In other implementations, one or more distance measurement units may be capable of measure distances at multiple different directions or angles. The measured relative distance information can be communicated to the remote central computer system 106 allowing the remote central computer system to track movement of the motorized transport unit and/or use the distance information to determine a current and/or predicted location of the motorized transport unit and provide movement instructions.

In some embodiments, the motorized transport unit 602 includes one or more light receiver units and/or light source identifiers configured to detect light from one or more light sources and extract and/or determine a unique light source identifier from the detected light. The light is typically received from predefined light sources that emit light with encoded unique light source identifiers within the emitted light. The light receiver unit 612 detects the light and extracts the unique light source identifier encoded in the emitted light. As a further example, a signal can be encoded in the light output from one or more LED or bulb light sources. The light receiver unit 612, which in some instances can comprise one or more cameras, light sensors, photodiodes, etc., detects and decodes this signal to obtain a light source identifier and/or location information that can be used in determining a position relative to the light source. Similarly, other light receiver units or devices can alternatively or additionally be used such as a camera on a user interface unit 114, a light receiver unit on other devices (e.g., movable item container, detectors carried by shopping facility associates, etc.) to detect the light source identifiers and/or signals. The detected light source identifier can, in some implementations, be communicated to the central computer system 106 to potentially be used in determining a location of the motorized transport unit based on a known location of the light source associated with the detected light source identifier. The location information can include, for example coordinates, grid information or other such information that typically correspond with a shopping facility mapping.

The camera and/or video recording unit 624 (referred to below generally as the video recording unit) can include one or more cameras configured to capture images and/or video content of products and other aspects of the shopping facility that can be communicated to the remote customer's user interface unit to allow the remote customer to visually see at least portions of products and/or the shopping facility to enhance the remote customer's cooperative shopping experience. The camera 624 may be activated by default (such as upon association with a remote customer), while in other instances the video recording unit may be activated in response to a command from the local customer, the central computer system, the remote customer or the like. Similarly, the video recording unit may be active for an extended period of time, such as once activated it is maintained active unit the local or remote customer is disassociated with the corresponding motorized transport unit and/or the movable item container; or may be activated for a limited time to provide a remote customer with a picture or relatively short video and then shut down until a subsequent command to activate. Still further, different commands may be used to implement a temporary activation and an extended activation. In some embodiments, the central computer system and/or the motorized transport unit may track movements of the local customer in identifying relevant product information and/or identify how to direct the one or more video recording units (e.g., motors that can move the cameras, motors to move the motorized transport unit, etc.) to capture video consistent with the local customer's movements and/or the products being considered by the local customer. Some embodiments may additionally or alternatively include one or more audio sensors, audio detection system and/or audio output systems. The audio system, similar to the camera, may be activated by default (such as upon association with a remote customer), while in other instances the video recording unit may be activated in response to a command from the local customer, the central computer system, the remote customer or the like. In some embodiments, the central computer system and/or the motorized transport unit may track movements of the local customer in identifying relevant product information and/or identify how to direct the one or more audio recording units to capture audio consistent. In some instances, for example, the audio system may receive voice commands that allow the motorized transport unit and/or the central computer system to identify corresponding instructions be implemented by the motorized transport unit.

Figure 7:
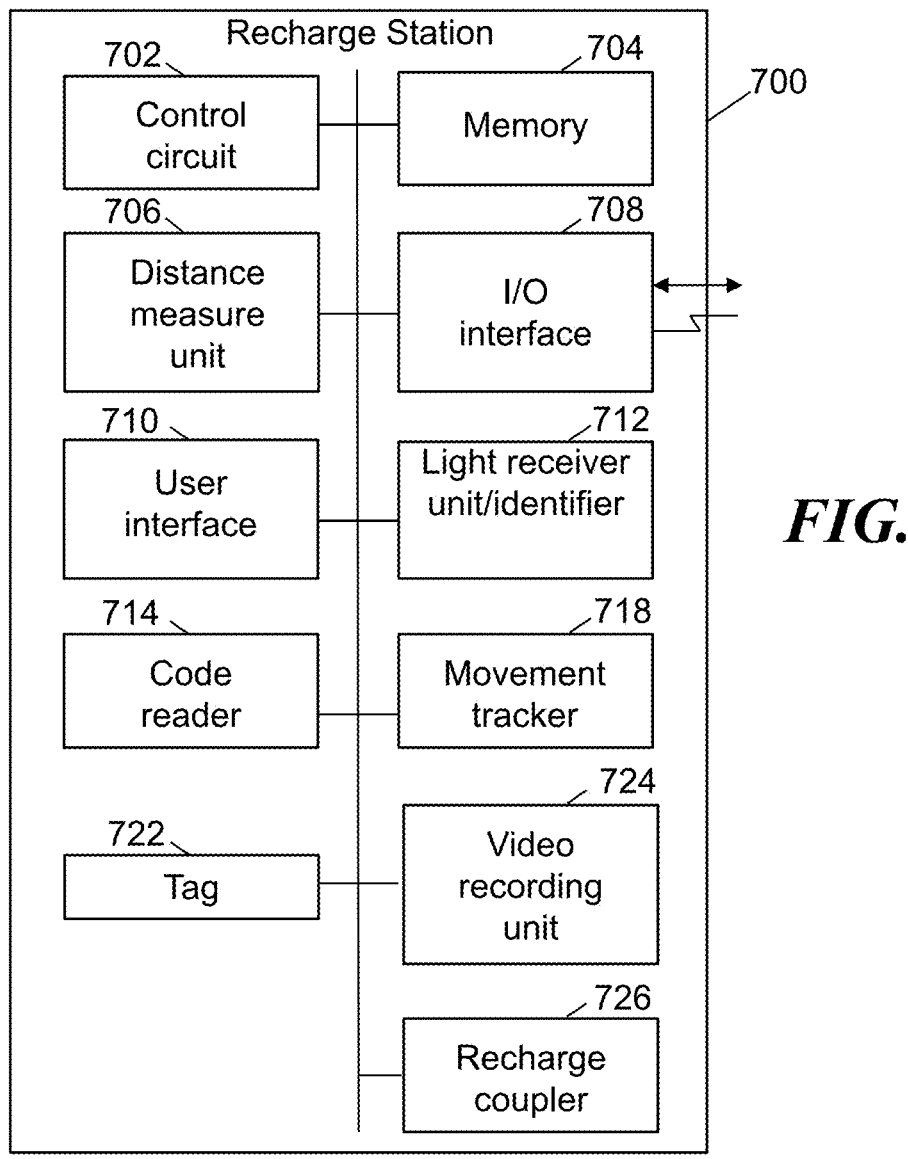
FIG. 7 shows a simplified block diagram of an exemplary recharge station, in accordance with some embodiments.

FIG. 7 shows a simplified block diagram of an exemplary recharge station 700, in accordance with some embodiments. As described above and further below, in some embodiments, the recharge station 700 is or is part of a docking station 122, a dispenser 120, or is a separate recharging station. The recharge station includes a control circuit 702, memory 704, one or more input/output (I/O) interfaces 708, and one or more recharge couplers 726. In some embodiments, the recharge station includes one or more user interfaces 710.

Further, in some embodiments, the recharge station may also include one or more sensors and/or measurement units, such as but not limited to one or more distance measurement units 706, light receiver units 712, optical and/or machine readable code readers 714, movement tracker units 718, camera and/or video recording unit 724, audio sensors and/or recorders, and/or other such sensors and measurement units, and typically a combination of two or more of such sensors. In some embodiments, a recharge station may include one or more tags 722 or other device that may be detectable, such as by location tracking units located at one or more positions throughout the shopping facility, by one or more motorized transport units, movable item containers 104, or by other devices at the shopping facility. In some embodiments, the tag 622 is an RFID tag or other tag, and can in some instances provide a unique identifier of the motorized transport unit.

The recharge coupler 726 is configured to couple at least with the recharge coupler 626 of a motorized transport unit 102, and typically a plurality if not all of the motorized transport units at a shopping facility. As such, the recharge coupler 726 allows the motorized transport unit to temporarily electrically couple with the recharge station 700 to recharge one or more power storage devices of the motorized transport unit (e.g., battery, capacitor, etc.). The recharge station further includes one or more electrical power sources (not shown) or it may receive power from an external source. In some implementations, the recharge station includes one or more batteries, capacitors, or other such power storage devices, or combinations of such power storage devices that can be used to power the recharge station and/or supply electrical power to a motorized transport unit in charging one or more power storage devices of the motorized transport unit. As further described herein, in some implementations, the recharge station is configured to utilize electrical power stored in one or more other motorized transport units cooperated with the recharge station in charging a first motorized transport unit. In some embodiments, the recharge coupler 726 is positioned such that it is not readily accessible to humans providing added safety to the recharge station.

The control circuit 702 of the recharge station 700 typically comprises one or more processors and/or microprocessors. Generally, the memory 704 stores the operational code or set of instructions that is executed by the control circuit 702 and/or processor to implement the functionality of the recharge station. In some embodiments, the memory 704 may also store some or all of particular data that may be needed to determine a current location of recharge station, identify a motorized transport unit, communicate with the central computer system, communicate with one or more motorized transport units electrically and/or communicationally coupled with the recharge station, track recharging of one or more motorized transport units, track power levels of one or more motorized transport units couple with the recharge station, track one or more power levels of local power storage sources or devices of the recharge station, and the like. Such data may be pre-stored in the memory or be determined, for example, from detected measurements, light and the like, and/or communicated to the recharge station, such as from the central computer system 106, a motorized transport unit, a user interface unit 114, other source or combination of such sources. It is understood that the control circuit 702 and/or processor may be implemented as one or more processor devices as are well known in the art. Similarly, the memory 704 may be implemented as one or more memory devices as are well known in the art, such as one or more processor readable and/or computer readable media and can include volatile and/or nonvolatile media, such as RAM, ROM, EEPROM, flash memory and/or other memory technology. Further, the memory 704 is shown as internal to the recharge station; however, the memory 704 can be internal, external or a combination of internal and external memory. While FIG. 7 illustrates the various components being coupled together via a bus, it is understood that the various components may actually directly couple with the control circuit 702 and/or one or more other components.

Generally, the control circuit 702 and/or electronic components of the recharge station can comprise fixed-purpose hard-wired platforms or can comprise a partially or wholly programmable platform. Again, these architectural options are well known and understood in the art and require no further description here. The motorized transport unit and/or control circuit can be configured (for example, by using corresponding programming as will be well understood by those skilled in the art) to carry out one or more of the steps, actions, and/or functions described herein.

The control circuit 702 can be configured, in part, to provide overall control and/or coordinate operation of the components of the recharge station. For example, the control circuit 702 can implement code to determine a current location of recharge station, identify a motorized transport unit, communicate with the central computer system, communicate with one or more motorized transport units electrically and/or communicationally coupled with the recharge station, track recharging of one or more motorized transport units, track power levels of one or more motorized transport units couple with the recharge station, track one or more power levels of local power storage sources or devices of the recharge station, obtain data from one or more sensors, evaluate sensor data, and the like.

The user interface 710 can be included and/or coupled with the recharge station, which may be used for user input and output. For example, the user interface 710 may include any known input devices, such one or more buttons, knobs, selectors, switches, keys, touch input surfaces, audio unit, and/or displays, etc. Additionally, the user interface may include one or more output audio and/or display devices, such as lights, visual indicators, display screens, etc. to convey information to a user.

Referring back to FIG. 1, the central computer system 106 is configured to monitor the multiple motorized transport units and identify motorized transport units that have power levels that are below at least a first power level threshold indicating that the motorized transport unit should be cooperated with a docking station, dispenser or other recharge station. In some instances, the motorized transport units communicate their power levels to the central computer system based on a schedule, periodically, in response to power levels dropping below one or more power thresholds, in response to power levels increasing due to charging above one or more charging power thresholds, in response to a request from the central computer system, or the like. Further, the communication of the power level may be in response to a prediction of when power levels are predicted to drop below one or more threshold levels. The prediction can depend on one or more factors, such as expected customer shopping duration, areas of the shopping facility passed through during a shopping experience, shopping list, expected products to be purchased by a customer, rate at which power levels are dropping on the motorized transport unit, other such factors, and typically a combination of such factors. The recharge stations are configured to at least electrically couple with one or more the motorized transport units to recharge the motorized transport unit. Accordingly, the central computer system can determine when to direct motorized transport units to recharge stations, and to which recharge station a motorized transport unit should be directed.

Typically, the shopping assistance system 100 includes multiple docking stations that are distributed through the shopping facility and the motorized transport units are not restricted to a single docking station. Upon identifying a motorized transport unit that should be recharged, the central computer system evaluates the recharge stations to identify an available recharge station. The identification of an available recharge station can be dependent on one or more factors, including at least that a recharge station is capable of electrically coupling with the motorized transport unit at the time the central computer system intends to issue a recharging command, which may be at a current time, scheduled by the central computer system at a later time based for example on an anticipated need to recharge, or the like. Additional or alternative factors may be considered such as a proximity of the recharge station to the motorized transport unit, a capability of the low power motorized transport unit to transport itself to the recharge station, a location of a second motorized transport unit that may replace a first motorized transport unit, other such factors, and typically a combination of such factors.

Figure 8:
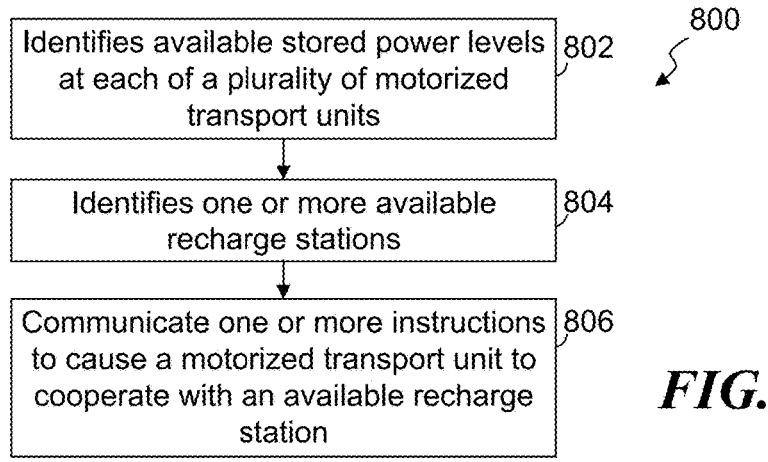
FIG. 8 illustrates a simplified flow diagram of an exemplary process implemented by the central computer system in issuing one or more commands to implement a recharging of one or more motorized transport units in accordance with some embodiments.

FIG. 8 illustrates a simplified flow diagram of an exemplary process 800 implemented by the central computer system 106 in issuing one or more commands to implement a recharging of one or more motorized transport units in accordance with some embodiments. In step 802, the control circuit of the central computer system 106 identifies available stored power levels at each of a plurality of motorized transport units distributed through the shopping facility. Typically, each of the motorized transport units wirelessly communicates their power levels to the central computer system 106. The power levels may be communicated in response to a request wirelessly received from the central computer system, in response to a schedule stored on the motorized transport unit, in response to the control circuit of the motorized transport unit detecting that the power level of the motorized transport unit has dropped below a locally stored threshold level, or the like.

The central computer system is configured to evaluate the power levels relative to one or more threshold power levels. For example, the central computer system may evaluate a first threshold that triggers the central computer system to flag the motorized transport unit as in need of a recharging. Similarly, a second threshold may indicate a higher priority status because the motorized transport unit has been unable to be cooperated with a recharge station for one or more reasons and the power level has dropped below the second threshold that is lower than the first threshold. A third threshold may be dependent on whether one or more other motorized transport units may be available and/or within a threshold distance that can be used to replace a motorized transport unit having a power level that is below the third threshold. Still further, a fourth threshold may be considered upon a customer completing her/his use of a motorized transport unit. In some instances, the fourth threshold may be higher than some other thresholds because the motorized transport unit is no longer being used and recharging would not interfere with a customer's shopping experience. A fifth threshold may be set corresponding to when all other motorized transport units are in use and a customer has requested a motorized transport unit. A sixth threshold may be set as dependent on an anticipated time or duration when a customer using a motorized transport unit is predicted to be done with her/his shopping experience. The anticipation can be based on an evaluation of a customer profile, including typically shopping durations, recent products purchased, a shopping list being used by the customer, products already acquired by the customer when such information is available, locations within the shopping facility that the customer has already passed through relative to products on a list and/or locations where the customer is anticipated to go to based on a list, and other such factors. Other threshold may be set based on one or more of such above factors and/or other different factors.

In step 804, the control circuit 202 identifies one or more available recharge stations, of a plurality of recharge stations distributed throughout the shopping facility. In some instances, the identification of the one or more recharge stations is relative to a location of the motorized transport unit intended to be subjected to recharging. In some embodiments, the control circuit determines a location at the shopping facility of at least the motorized transport unit of the plurality of motorized transport units in need of a recharge. Further, the control circuit in identifying the available recharge station is configured to identify that the available recharge station is a closest recharge station of the plurality of recharge stations to the motorized transport unit and has an available coupling configured to couple at least with the motorized transport unit to supply electrical power to the motorized transport unit. Some embodiments take into consideration alternative or additional factors, such as a power level of the motorized transport unit, a location of the recharge station, whether the recharge station can be moved to the motorized transport unit, whether a replacement motorized transport unit is available to take the place of the low power motorized transport unit, whether a recharge station can deliver a replacement motorized transport unit, or other such factors, and typically a combination of two or more of such factors.

In step 806, one or more instructions are wirelessly communicated to cause a motorized transport unit to cooperate with an available recharge station. In some instances, the control circuit causes one or more movement commands to be communicated to the motorized transport unit to cause the motorized transport unit to move itself consistent with the one or more commands toward an intended recharge station. For example, the control circuit may wirelessly communicate one or more instructions to a motorized transport unit directing the motorized transport unit to implement one or more physical movements through at least a portion of the shopping facility such that the motorized transport unit approaches the available recharge station. In some embodiments, the recharge station may be movable. Accordingly, one or more movement commands may additionally or alternatively be communicated to cause movements to be implemented to move the recharge station consistent with the one or more commands toward an intended motorized transport unit. For example, one or more instructions can be wirelessly communicate to the available recharge station directing the available recharge station to implement one or more physical movements through at least a portion of the shopping facility such that the available recharge station approaches the first motorized transport unit.

Again, in some implementations, the central computer system 106 monitors and/or manages the motorized transport units 102. Accordingly, the central computer system take note of and/or internally flag a motorized transport unit as unavailable or temporarily out of availability inventory of motorized transport units when the motorized transport unit is cooperated with a recharge station. Similarly, the central computer system may set a motorized transport unit status as being docked with a recharge station. Further, the central computer system may estimate a down time of the motorized transport unit based upon one or more factors, such as past performance, past recharging, past recharging at a particular recharge station, available power for recharging at a mobile recharge station, other such factors, or combinations of such factors. Accordingly, the central computer system may track down times for each motorized transport unit. One or more logs, reports or the like may be maintained and/or distributed (e.g., to a shopping facility manager, maintenance department, a shopping facility headquarters, and the like).

As introduced above, some embodiments direct a motorized transport unit to take the place of a motorized transport unit with a power level below a threshold. This allows low power motorized transport unit cooperated with a customer and moving a movable item container for the customer to be swapped out with another motorized transport unit having a greater stored power in attempts to reduce or eliminate issues that can adversely affect a customer's shopping experience (e.g., having to change movable item containers, having the customer manually move the motorized transport unit to a recharge station, etc.). For example, in some embodiments, a dispense command is communicated to a recharge station and/or a motorized transport unit cooperated with the recharge station instructing the station and/or motorized transport unit to dispense a more fully charged motorized transport unit. Accordingly, the dispense command in some implementations causes a more fully charged motorized transport unit to be dispensed from a recharge station such that the second motorized transport unit is dispensed from the recharge station to removably couple with the movable item container in place of the low power motorized transport unit such that the higher charged motorized transport unit when coupled with the movable item container is configured to move the movable item container through one or more areas of the shopping facility.

In some embodiments, the recharge station includes one or more motorized wheel systems to move the recharge station through the shopping facility. In other embodiments, a motorized transport unit cooperated with the recharge station is configured to operate as a motorized wheel system of the recharge station such that the motorized transport unit moves the recharge station. Accordingly, in some implementations, the central computer system 106 is configured to communicate one or more instructions to the motorized transport unit cooperated with the available recharge station directing the motorized transport unit to move the available recharge station through at least a portion of the shopping facility such that the available recharge station approaches and/or couples with the low power motorized transport unit.

Figure 9:
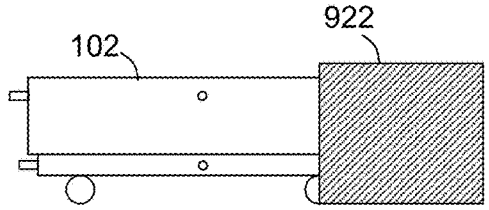
FIG. 9 shows a simplified block diagram of a recharge docking station, in accordance with some embodiments.

FIG. 9 shows a simplified block diagram of a recharge docking station 922, in accordance with some embodiments. The docking station includes one or more recharge couplers 726 that are configured to electrically couple with one or more motorized transport units and to supply electrical power to the motorized transport unit to recharge one or more power sources internal to the motorized transport unit. In some implementations, the docking station 922 is configured to partially or fully receive one or more motorized transport units 102 and electrically couple with the motorized transport unit. The docking station recharges the one or more motorized transport units while they are coupled with the docking station. Further, as described herein, the docking station may be in communication with the central computer system, for example, to notify the central computer system that it is charging a motorized transport unit, that a motorized transport unit is fully charged, and/or that a motorized transport unit has decoupled from the docking station such that a recharging connector is available for an alternative motorized transport unit. Similarly, the docking station may be in communication with the motorized transport unit, such as to receive charge levels of the internal power storage units of the motorized transport unit, an identifier of the motorized transport unit, and/or other such communications. Typically, the docking station is stationary and electrically coupled with an electrical power of the shopping facility. Further, the docking station may be positioned within the shopping facility such that it is not readily accessible to customers of the shopping facility to enhance safety.

Figure 10:
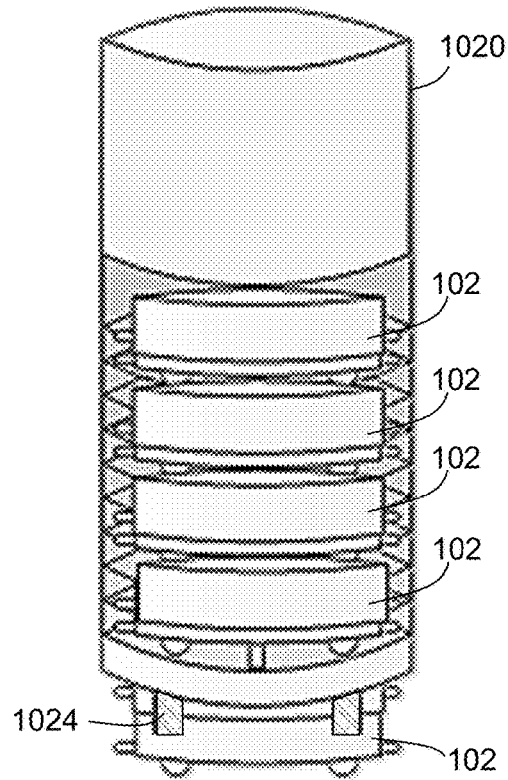
FIG. 10 shows a simplified exposed view of a motorized transport unit dispenser, in accordance with some embodiments.

FIG. 10 shows a simplified exposed view of a motorized transport unit dispenser 1020 and/or mobile recharge docking station, in accordance with some embodiments. The recharge dispenser 1020 is configured to receive one or more motorized transport units. In some implementations, one or more of the motorized transport units may couple with a recharge coupler of the dispenser 1020 to recharge the one or more motorized transport units while they are positioned within the dispenser. Further, the dispenser may be configured to cooperate with the one or more motorized transport units such that a bottom most motorized transport unit may extend from a bottom of the dispenser allowing the bottom most motorized transport unit to move the dispenser. For example, in some applications, the motorized transport unit is configured to telescope to increase its height or at least to lift the dispenser allowing the motorized transport unit to move the dispenser.

Further, the central computer system may communicate instructions to the bottom most motorized transport unit. In other implementations, the movement instructions may be relayed through the dispenser to the bottom most motorized transport unit. Similarly, the central computer system 106 may issue instructions that one or more motorized transport units within the movable dispenser be dispensed from the dispenser. In some instances, the bottom most motorized transport unit receives the dispensing instruction and disengages from the dispenser in response to the instruction. For example, the bottom most motorized transport unit may de-telescoped reducing its height such that the dispenser is supported by legs or stands 1024, and the reduced height is less than the leg height or a distance between the floor and a bottom of a storage compartment. The motorized transport unit can then disengage from the dispenser 120 and move out from underneath the dispenser and proceed to an instructed location within the shopping facility (e.g., to replace a low power motorized transport unit, cooperate with a movable item container, etc.).

Similar engagement instructions can be communicated to a low power motorized transport unit to telescope and engage with the dispenser. In some instances, when a power level of a motorized transport unit to be engaged with a dispenser is below a threshold (e.g., dispenser movement threshold), an additional motorized transport unit already engaged with and/or within the dispenser is dispensed allowing the low power motorized transport unit to engage with the dispenser followed by the additional motorized transport station reengaging with the dispenser to allow the additional motorized transport unit to operate and move the dispenser through the shopping facility.

The recharge coupler 626 of the motorized transport unit and the recharge coupler 726 of the docking station or dispenser are configured to cooperate to provide power at least from the docking station or dispenser to the motorized transport unit. The coupling can be through a plug system (e.g., the docking station includes one or more plugs that can be extended to engage a receptacle on the motorized transport unit), through contact between two electrically conductive contacts (e.g., the dispenser may include one or more charge bars extending up vertical, helically, or the like, through an interior of the dispenser that is contacted by one or more electrodes (e.g., retractable electrodes) of the motorized transport unit), or other such coupling. In some implementations, when the dispenser is movable, the dispenser includes a battery or other electrical power storage device that can supply power to the motorized transport unit. Additionally or alternatively, power from one or more other motorized transport units may be used to charge another motorized transport unit at the dispenser.

In some implementations, the docking station and the dispenser may comprise a recharge controller that controls the distribution of power between the one or more motorized transport units and/or one or more internal power storage devices of the docking station or dispenser. The dispenser may further temporarily couple with an electrical source such as a docking station to provide electrical power to the one or more motorized transport units and/or to charge its internal power supply. Typically, the one or more docking stations for the movable dispenser are fixed and do not move. A motorized transport unit may move the movable dispenser to the docking station. In some implementations, the docking station may also be considered a fixed recharge station configured to electrically couple with one or more movable dispenser and motorized transport stations. Accordingly, in some instances, the recharge coupler of the motorized transport unit is similar to a recharge couple of the movable dispenser that is configured to couple with the docking station. In this configuration, the number of recharge stations can be increased by providing the one or more movable dispenser and the one or more fixed docking stations.

When one or more of the recharge stations are mobile (e.g., the dispenser 120), the central computer system can be further configured to track the location of each of the movable recharge stations. Using the location information of the recharge stations and the motorized transport units, the central computer can identify available recharge stations and routes to cooperate a low power motorized transport units with the recharge station (e.g., a docking station, dispenser, etc.), which can include communicating instructions to the low power motorized transport unit, the movable recharge station, a motorized transport unit moving a recharge station, or a combination thereof. In some embodiments, the central computers determines a location at the shopping facility of an available recharge station (e.g., dispenser), where the available recharge station is configured to move throughout at least a portion of the shopping facility. A route can be determined by the central computer system between the location of the available recharge station and the location of the low power motorized transport unit. One or more instructions can be communicated consistent with the determined route. The communicated one or more instructions are configured to cause physical movement by the low power motorized transport unit, the recharge station, a secondary motorized transport unit (e.g., moving the recharge station, to retrieve the low power motorized transport unit, other such movement, or a combination thereof) consistent with the determined route. For example, in some embodiments, the control circuit can be configured to communicate an instruction to the available recharge station or a secondary motorized transport unit that can move the recharge station, directing the available recharge station or secondary motorized transport unit to implement one or more physical movements consistent with the determined route through at least a portion of the shopping facility such that the available recharge station approaches the low power motorized transport unit. Some embodiments combine the remote processing by the central computer system of movement and/or routing for major routing changes with the local processing on the motorized transport unit that can perform minor routing changes in order to enable efficient autonomous control of the motorized transport unit, such as to avoid objects (e.g., based on information from one or more sensors, board IR, sonic, camera sensors to look for minor obstructions to route around). Additionally or alternatively, the motorized transport unit may request the central computer system provide major route changes, such as in response to detecting a chosen route is blocked.

Again, in some instances, when a power level of a motorized transport unit drops below a threshold, an alternative motorized transport unit may be directed to replace the low power motorized transport unit. For example, some embodiments identify a replacing motorized transport unit, of the plurality of motorized transport units, having a power level greater than a first power level threshold. The first power level threshold may be based on a power level of a motorized transport unit being replaced, based on an expected duration of use of the replacement motorized transport unit (e.g., based on a customer profile, customer shopping list, locations the customer has already passed through at the shopping facility, etc.). In some embodiments, a customer receives advanced notice when the power level of the motorized transport unit drops below a threshold informing the customer of potential recharging needs of the motorized transport unit. The notice may inform the customer with an estimated time remaining. Similarly, advanced notice can be provided to the customer of potential motorized transport unit swapping. For example, a user interface unit (e.g., smart device) on the movable item container 104 can audibly and/or visually notify the customer. Similarly, the motorized transport unit may notify the customer (e.g., display an out of service notification), or a notification can be communicated to a user interface unit carried by the customer (whether it is the customer's or provided by the shopping facility).

Further, the central computer system and/or the low power motorized transport unit may predict when the power level of the low power motorized transport unit is expected to drop below a threshold, such as a critical threshold where performance of the motorized transport unit may start to deteriorate or a threshold where the motorized transport unit may experience difficulty in reaching a recharge station. Based on the predicted power level dropping below the threshold, the central computer system can direct the replacement motorized transport unit to take the place of the low power transfer unit prior to the power level on the low power motorized transport unit dropping below the critical threshold. Further, it may be advantageous to maximize use of motorized transport units to cause a swapping of motorized transport units just prior to the power level of the low power motorized unit dropping below the critical threshold. Again, because a second motorized transport unit can couple with a movable item container 104 in place of the low power motorized transport unit a customer does not have to remove products from the cart or switch carts, while still being able to take advantage of the help and support provided by the motorized transport unit and/or central computer system.

The central computer system can wirelessly communicate one or more instructions including a replace instruction to cause the replacement motorized transport unit to move through at least a portion of the shopping facility and to removably couple with the movable item container in place of the low power motorized transport unit to move the movable item container through one or more areas of the shopping facility. Similarly, a decoupling command may be communicated to the low power motorized transport unit to cause the low power transport unit to disengage from the movable item container. Further, instructions can be directed to the low power transport unit to move toward a recharge station.

Additionally or alternatively, a motorized transport unit can be instructed to retrieve a low power motorized transport unit. For example, when a low power motorized transport unit has a power level that drops below a threshold such that the low power motorized transport unit is unable to effectively move itself, a higher power motorized transport unit can be instructed to the location of the low power transport unit. A further instruction can cause the higher power motorized transport unit to couple with the low power transport unit (e.g., a clasp, magnetics, push contact, or the like). The higher power motorized transport unit can then be instructed to move the low power transport unit to an available recharge station. In some embodiments, a motorized transport unit can carry a backup battery, and drop a low power battery for recharge at a recharge station and continue using the other battery. The motorized transport unit can then be notified when battery is fully charged, and can retrieve the charged battery when convenient. Similarly, the central computer system can locate a nearest available recharge station with one or more fully charged spare batteries that can be used by a motorized transport unit and direct the motorized transport unit to acquire a charged battery from the identified recharge station.

In some embodiments, apparatuses and methods are provided herein useful to monitor power levels of portable units. In some embodiments, an apparatus configured to monitor power levels at a shopping facility, comprises: a transport unit central control system separate and distinct from a plurality of self-propelled motorized transport units at a shopping facility, wherein the transport unit central control system comprises: a transceiver configured to wirelessly receive communications from the plurality of motorized transport units located at the shopping facility; a control circuit coupled with the transceiver; a memory coupled to the control circuit and storing computer instructions that when executed by the control circuit cause the control circuit to: identify available stored power levels at each of the plurality of motorized transport units; identify an available recharge station, of a plurality of recharge stations distributed throughout the shopping facility, at least relative to a location of the first motorized transport unit intended to be subjected to recharging; and wirelessly communicate one or more instructions to cause the first motorized transport unit to cooperate with an available recharge station.

In some embodiments, a method of recharging of a motorized transport unit at a shopping facility, comprises: identifying available stored power levels for each of a plurality of motorized transport units at a shopping facility; identifying an available recharge station, of a plurality of recharge stations distributed throughout the shopping facility, relative to a location of the first motorized transport unit intended to be subjected to recharging; and wirelessly communicating one or more instructions to cause the first motorized transport unit to cooperate with an available recharge station.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. An apparatus configured to monitor power levels at a shopping facility, comprising:
a transport unit central control system separate and distinct from a plurality of motorized transport units at a shopping facility, wherein each of the plurality of motorized transport units is self-propelled and wherein the transport unit central control system comprises:
a transceiver configured to wirelessly receive communications from the plurality of motorized transport units located at the shopping facility;
a control circuit coupled with the transceiver;
a memory coupled to the control circuit and storing computer instructions that when executed by the control circuit cause the control circuit to:
identify available stored power levels at each of the plurality of motorized transport units;
identify, based on the identified stored power levels, a first motorized transport unit to be subjected to recharging;
identify an available recharge station, of a plurality of recharge stations distributed throughout the shopping facility, at least relative to a location of the first motorized transport unit intended to be subjected to recharging; and
cause the transceiver to wirelessly communicate one or more instructions to cause the first motorized transport unit to temporarily electrically couple with the available recharge station, wherein the control circuit in causing the communication of the one or more instructions causes a wireless communication of a first instruction to the first motorized transport unit directing the first motorized transport unit to implement one or more physical movements through at least a portion of the shopping facility such that the first motorized transport unit approaches the available recharge station.

2. The apparatus of claim 1, wherein the control circuit in causing the communication of the one or more instructions is configured to cause the transceiver to wirelessly communicate a second instruction to the available recharge station directing the available recharge station to implement one or more physical movements through at least a portion of the shopping facility such that the available recharge station approaches the first motorized transport unit.

3. The apparatus of claim 1, wherein the control circuit in identifying the available recharge station is configured to identify that the available recharge station is a closest recharge station of the plurality of recharge stations to the first motorized transport unit and has an available coupling configured to couple at least with the first motorized transport unit to supply electrical power to the first motorized transport unit.

4. An apparatus configured to monitor power levels at a shopping facility, comprising:
  a transport unit central control system separate and distinct from a plurality of motorized transport units at a shopping facility, wherein each of the plurality of motorized transport units is self-propelled and wherein the transport unit central control system comprises:
    a transceiver configured to wirelessly receive communications from the plurality of motorized transport units located at the shopping facility;
    a control circuit coupled with the transceiver;
    a memory coupled to the control circuit and storing computer instructions that when executed by the control circuit cause the control circuit to:
      identify available stored power levels at each of the plurality of motorized transport units;
      identify, based on the identified stored power levels, a first motorized transport unit to be subjected to recharging;
      identify an available recharge station, of a plurality of recharge stations distributed throughout the shopping facility, at least relative to a location of the first motorized transport unit intended to be subjected to recharging; and
      cause the transceiver to wirelessly communicate one or more instructions to cause the first motorized transport unit to temporarily electrically couple with the available recharge station;
  wherein the control circuit in causing the transceiver to wirelessly communicate the one or more instructions is configured to cause the transceiver to wirelessly communicate an instruction to the available recharge station directing the available recharge station to implement one or more physical movements through at least a portion of the shopping facility such that the available recharge station approaches the first motorized transport unit.

5. The apparatus of claim 4, wherein the control circuit is further configured to:
  cause the transceiver to communicate a dispense command causing a second motorized transport unit to be dispensed from the available recharge station such that the second motorized transport unit is dispensed from the available recharge station to removably couple with a movable item container in place of the first motorized transport unit such that the second motorized transport unit when coupled with the movable item container is configured to move the movable item container through one or more areas of the shopping facility.

6. An apparatus configured to monitor power levels at a shopping facility, comprising:
  a transport unit central control system separate and distinct from a plurality of motorized transport units at a shopping facility, wherein each of the plurality of motorized transport units is self-propelled and wherein the transport unit central control system comprises:
    a transceiver configured to wirelessly receive communications from the plurality of motorized transport units located at the shopping facility;
    a control circuit coupled with the transceiver;
    a memory coupled to the control circuit and storing computer instructions that when executed by the control circuit cause the control circuit to:
      identify available stored power levels at each of the plurality of motorized transport units;
      identify, based on the identified stored power levels, a first motorized transport unit to be subjected to recharging;
      identify an available recharge station, of a plurality of recharge stations distributed throughout the shopping facility, at least relative to a location of the first motorized transport unit intended to be subjected to recharging; and
      cause the transceiver to wirelessly communicate one or more instructions to cause the first motorized transport unit to temporarily electrically couple with the available recharge station;
  wherein the control circuit in causing the transceiver to wirelessly communicate the one or more instructions is configured to wirelessly communicate an instruction to a second motorized transport unit cooperated with the available recharge station directing the second motorized transport unit to move the available recharge station through at least a portion of the shopping facility such that the available recharge station approaches the first motorized transport unit.

7. An apparatus configured to monitor power levels at a shopping facility, comprising:
  a transport unit central control system separate and distinct from a plurality of motorized transport units at a shopping facility, wherein each of the plurality of motorized transport units is self-propelled and wherein the transport unit central control system comprises:
    a transceiver configured to wirelessly receive communications from the plurality of motorized transport units located at the shopping facility;
    a control circuit coupled with the transceiver;
    a memory coupled to the control circuit and storing computer instructions that when executed by the control circuit cause the control circuit to:
      identify available stored power levels at each of the plurality of motorized transport units;
      identify, based on the identified stored power levels, a first motorized transport unit to be subjected to recharging;
      identify an available recharge station, of a plurality of recharge stations distributed throughout the shopping facility, at least relative to a location of the first motorized transport unit intended to be subjected to recharging; and
      cause the transceiver to wirelessly communicate one or more instructions to cause the first motorized transport unit to temporarily electrically couple with the available recharge station;
  wherein the control circuit is further configured to:
  identify a second motorized transport unit of the plurality of motorized transport units having a power level greater than a first power level threshold; and
  cause the transceiver to wirelessly communicate a replace instruction to cause the second motorized transport unit to move through at least a portion of the shopping facility and to removably couple with a movable item container in place of the first motorized transport unit to move the movable item container through one or more areas of the shopping facility.

8. An apparatus configured to monitor power levels at a shopping facility, comprising:
a transport unit central control system separate and distinct from a plurality of motorized transport units at a shopping facility, wherein each of the plurality of motorized transport units is self-propelled and wherein the transport unit central control system comprises:
a transceiver configured to wirelessly receive communications from the plurality of motorized transport units located at the shopping facility;
a control circuit coupled with the transceiver;
a memory coupled to the control circuit and storing computer instructions that when executed by the control circuit cause the control circuit to:
identify available stored power levels at each of the plurality of motorized transport units;
identify, based on the identified stored power levels, a first motorized transport unit to be subjected to recharging;
identify an available recharge station, of a plurality of recharge stations distributed throughout the shopping facility, at least relative to a location of the first motorized transport unit intended to be subjected to recharging;
cause the transceiver to wirelessly communicate one or more instructions to cause the first motorized transport unit to temporarily electrically couple with the available recharge station; and
determine a location at the shopping facility of the available recharge station, wherein the available recharge station is configured to move throughout at least a portion of the shopping facility; and determine a route between the location of the available recharge station and the location of the first motorized transport unit, wherein the one or more instructions are configured to cause physical movement consistent with the determined route.

9. The apparatus of claim 8, wherein the control circuit in causing the transceiver to wirelessly communicate the one or more instructions is configured to cause the transceiver to wirelessly communicate an instruction to the available recharge station directing the available recharge station to implement one or more physical movements consistent with the determined route through at least a portion of the shopping facility such that the available recharge station approaches the first motorized transport unit.

10. A method of providing recharging of a motorized transport unit at a shopping facility, comprising:
identifying available stored power levels for each of a plurality of motorized transport units at a shopping facility;
identifying, based on the identified stored power levels, a first motorized transport unit to be subjected to recharging;
identifying, through a control circuit, an available recharge station, of a plurality of recharge stations distributed throughout the shopping facility, relative to a location of the first motorized transport unit intended to be subjected to recharging; and
wirelessly communicating one or more instructions to cause the first motorized transport unit to temporarily electrically couple with the available recharge station;
wherein the wirelessly communicating the one or more instructions comprises wirelessly communicating a first instruction to the first motorized transport unit directing the first motorized transport unit to implement one or more physical movements through at least a portion of the shopping facility such that the first motorized transport unit approaches the available recharge station.

11. The method of claim 10, wherein the wirelessly communicating the one or more instructions comprises wirelessly communicating a second instruction to the available recharge station directing the available recharge station to implement one or more physical movements through at least a portion of the shopping facility such that the available recharge station approaches the first motorized transport unit.

12. The method of claim 10, wherein the identifying the available recharge station comprises identifying that the available recharge station is a closest recharge station of the plurality of recharge stations to the first motorized transport unit and has an available coupling configured to couple at least with the first motorized transport unit to supply electrical power to the first motorized transport unit.

13. A method of providing recharging of a motorized transport unit at a shopping facility, comprising:
identifying available stored power levels for each of a plurality of motorized transport units at a shopping facility;
identifying, based on the identified stored power levels, a first motorized transport unit to be subjected to recharging;
identifying, through a control circuit, an available recharge station, of a plurality of recharge stations distributed throughout the shopping facility, relative to a location of the first motorized transport unit intended to be subjected to recharging; and
wirelessly communicating one or more instructions to cause the first motorized transport unit to temporarily electrically couple with the available recharge station;
wherein the wirelessly communicating the one or more instructions comprises wirelessly communicate an instruction to the available recharge station directing the available recharge station to implement one or more physical movements through at least a portion of the shopping facility such that the available recharge station approaches the first motorized transport unit.

14. The method of claim 13, further comprising:
wirelessly communicating a dispense command instructing the available recharge station to dispense a second motorized transport unit from the available recharge station to removably couple with a movable item container in place of the first motorized transport unit such that the second motorized transport unit when coupled with the movable item container is configured to move the movable item container through one or more areas of the shopping facility.

15. A method of providing recharging of a motorized transport unit at a shopping facility, comprising:
identifying available stored power levels for each of a plurality of motorized transport units at a shopping facility;
identifying, based on the identified stored power levels, a first motorized transport unit to be subjected to recharging;
identifying, through a control circuit, an available recharge station, of a plurality of recharge stations distributed throughout the shopping facility, relative to a location of the first motorized transport unit intended to be subjected to recharging;

wirelessly communicating one or more instructions to cause the first motorized transport unit to temporarily electrically couple with the available recharge station;

wherein the wirelessly communicating the one or more instructions comprises wirelessly communicating an instruction to a second motorized transport unit cooperated with the available recharge station directing the second motorized transport unit to move the available recharge station through at least a portion of the shopping facility such that the available recharge station approaches the first motorized transport unit.

16. A method of providing recharging of a motorized transport unit at a shopping facility, comprising:

identifying available stored power levels for each of a plurality of motorized transport units at a shopping facility;

identifying, based on the identified stored power levels, a first motorized transport unit to be subjected to recharging;

identifying, through a control circuit, an available recharge station, of a plurality of recharge stations distributed throughout the shopping facility, relative to a location of the first motorized transport unit intended to be subjected to recharging;

wirelessly communicating one or more instructions to cause the first motorized transport unit to temporarily electrically couple with the available recharge station;

identifying a second motorized transport unit of the plurality of motorized transport units having a power level greater than a first power level threshold; and wirelessly communicating a replace instruction to cause the second motorized transport unit to move through at least a portion of the shopping facility and to removably couple with a movable item container in place of the first motorized transport unit to move the movable item container through one or more areas of the shopping facility.

17. A method of providing recharging of a motorized transport unit at a shopping facility, comprising:

identifying available stored power levels for each of a plurality of motorized transport units at a shopping facility;

identifying, based on the identified stored power levels, a first motorized transport unit to be subjected to recharging;

identifying, through a control circuit, an available recharge station, of a plurality of recharge stations distributed throughout the shopping facility, relative to a location of the first motorized transport unit intended to be subjected to recharging;

wirelessly communicating one or more instructions to cause the first motorized transport unit to temporarily electrically couple with the available recharge station;

determining a location at the shopping facility of the available recharge station, wherein the available recharge station is configured to move throughout at least a portion of the shopping facility; and determining a route between the location of the available recharge station and the location of the first motorized transport unit, wherein the one or more instructions are configured to cause physical movement consistent with the determined route.

18. The method of claim 17, wherein the wirelessly communicating the one or more instructions comprises wirelessly communicating an instruction to the available recharge station directing the available recharge station to implement one or more physical movements consistent with the determined route through at least the portion of the shopping facility such that the available recharge station approaches the first motorized transport unit.

* * * * *